United States Patent
Lee et al.

(10) Patent No.: US 10,635,450 B2
(45) Date of Patent: Apr. 28, 2020

(54) ELECTRONIC DEVICE PERFORMING BOOTING OPERATION BASED ON BOOT-UP INSTRUCTION PROVIDED FROM ENDPOINT DEVICE

(71) Applicant: SAMSUNG ELECTRONICS CO., LTD., Suwon-si (KR)

(72) Inventors: Kwanggu Lee, Yongin-si (KR); Jongmin Kim, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 15/671,866

(22) Filed: Aug. 8, 2017

(65) Prior Publication Data
US 2018/0052694 A1  Feb. 22, 2018

(30) Foreign Application Priority Data
Aug. 16, 2016 (KR) .................... 10-2016-0103793

(51) Int. Cl.
  *G06F 9/4401* (2018.01)
  *G06F 13/40* (2006.01)
  *G06F 3/06* (2006.01)

(52) U.S. Cl.
  CPC ............ *G06F 9/4401* (2013.01); *G06F 3/061* (2013.01); *G06F 3/0659* (2013.01); *G06F 3/0685* (2013.01); *G06F 13/4022* (2013.01)

(58) Field of Classification Search
  CPC ...... G06F 9/4401; G06F 3/061; G06F 3/0659; G06F 3/0685; G06F 13/4022
  See application file for complete search history.

(56) References Cited

U.S. PATENT DOCUMENTS

| 7,131,033 | B1 | 10/2006 | Roper et al. |
| 7,506,087 | B2 | 3/2009 | Ho et al. |
| 8,719,483 | B2 | 5/2014 | Hidaka |

(Continued)

FOREIGN PATENT DOCUMENTS

| JP | 2002-149408 A | 5/2002 |
| JP | 2015-18355 A | 1/2015 |

(Continued)

OTHER PUBLICATIONS

Jackson, et al., "PCI Express Technology Comprehensive Guide to Generations 1.x,2.x,3.0", 2012, MindShare, Inc., 181 pages total.

*Primary Examiner* — Jaweed A Abbaszadeh
*Assistant Examiner* — Gayathri Sampath
(74) *Attorney, Agent, or Firm* — Sughrue Mion, PLLC

(57) ABSTRACT

An electronic device is provided. The electronic device includes a first memory, a second memory, and a controller. The first memory stores data of a boot-up instruction, and the second memory stores setting information associated with a condition in which communication with an external device is performed. The controller stores the setting information having a self-setting value in the second memory, before the second memory stores the setting information based on a command from the external device. The controller provides the data of the boot-up instruction to the external device in response to a memory read request received from the external device under a condition defined by the self-setting value.

20 Claims, 14 Drawing Sheets

(56) References Cited

U.S. PATENT DOCUMENTS

| | | | |
|---|---|---|---|
| 8,972,546 B2 | 3/2015 | Islam et al. | |
| 9,152,428 B2 | 10/2015 | Sarangshar | |
| 9,262,197 B2 | 2/2016 | Chawla et al. | |
| 9,984,021 B1* | 5/2018 | BeSerra | G06F 13/385 |
| 2006/0282602 A1 | 12/2006 | Liao et al. | |
| 2007/0283059 A1 | 12/2007 | Ho et al. | |
| 2008/0040462 A1 | 2/2008 | Islam et al. | |
| 2010/0017591 A1* | 1/2010 | Smith | G06F 9/4406 |
| | | | 713/2 |
| 2011/0185163 A1 | 7/2011 | Hidaka | |
| 2014/0095853 A1 | 4/2014 | Sarangshar | |
| 2014/0215199 A1* | 7/2014 | Ma | G06F 9/4406 |
| | | | 713/2 |
| 2015/0058533 A1* | 2/2015 | El-Batal | G06F 13/385 |
| | | | 711/103 |
| 2015/0143016 A1 | 5/2015 | Egi et al. | |
| 2015/0169331 A1 | 6/2015 | Nelogal et al. | |
| 2016/0019079 A1 | 1/2016 | Chawla et al. | |
| 2017/0115920 A1* | 4/2017 | Subramanian | G06F 9/4403 |

FOREIGN PATENT DOCUMENTS

| | | |
|---|---|---|
| KR | 10-0204565 B1 | 6/1999 |
| KR | 10-2010-0076445 A | 7/2010 |

* cited by examiner

ELECTRONIC DEVICE PERFORMING BOOTING OPERATION BASED ON BOOT-UP INSTRUCTION PROVIDED FROM ENDPOINT DEVICE

CROSS-REFERENCE TO RELATED APPLICATIONS

The present non-provisional application claims priority under 35 U.S.C. § 119 to Korean Patent Application No. 10-2016-0103793 filed on Aug. 16, 2016, in Korean Intellectual Property Office, the entire contents of which are herein incorporated by reference.

TECHNICAL FIELD

The example embodiments of the present disclosure described herein relate to an electronic device, and more particularly, relate to operations of devices that communicate with each other to perform a booting operation.

DESCRIPTION OF THE RELATED ART

Nowadays, various kinds of electronic devices are being used. An electronic device provides services to a user according to operations of one or more electric/electronic circuits included therein. The electronic device may operate independently, or may operate while communicating with other electronic device(s).

The electronic device performs a booting operation under control of a processor that is included therein or is separately provided. The booting operation is performed to allow the electronic device and electric/electronic circuits included therein to enter a state in which it is possible to provide services to the user. For example, according to the booting operation, the processor recognizes an endpoint device/peripheral device connected thereto, and loads an operating system. Further, according to the booting operation, the endpoint device/peripheral device prepares to receive an input from the processor or the user.

As the size and complexity of a system increase, it may take a long time to perform the booting operation. When the booting operation takes a long time, it may also take a long time to provide a service to the user. A fast booting operation may have great influence on improving the performance of the electronic device and user satisfaction.

SUMMARY

It is an aspect to provide a configuration and an operation scheme of an electronic device for performing a booting operation quickly.

According to an aspect of one or more example embodiments, there is provided an electronic device comprising a first memory configured to store data of a boot-up instruction; a second memory configured to store setting information associated with a condition in which communication with an external device is performed; and a controller. The controller is configured to store the setting information having a self-setting value in the second memory, before the second memory stores the setting information based on a command from the external device, and provide the data of the boot-up instruction to the external device in response to a memory read request, the memory read request being received from the external device under a condition defined by the self-setting value.

According to another aspect of one or more example embodiments, there is provided an electronic device comprising a first memory configured to store data of a boot-up instruction; a second memory configured to store setting information associated with a condition in which communication with an external device is performed; a logic circuit configured to store the setting information having a self-setting value in the second memory, before the second memory stores the setting information based on a command from the external device; and a controller configured to provide the data of the boot-up instruction to the external device in response to a memory read request under a condition defined by the self-setting value, the memory read request being received from the external device.

According to yet another aspect of one or more example embodiments, there is provided an electronic device comprising a switch device comprising a host port configured to be connected to a host, a plurality of endpoint ports configured to be respectively connected to a plurality of endpoint devices, and first memories each configured to store setting information, the setting information of one of the first memories being associated with a condition in which communication with the host is performed through the host port and the setting information of the other first memories being associated with a condition in which communication with the endpoint ports is performed through the respective endpoint ports, respectively; and a target endpoint device configured to be connected to a target endpoint port among the plurality of endpoint ports, and configured to store data of a boot-up instruction, wherein the switch device is configured to store, before the first memories store the setting information based on a command from the host, the setting information having a self-setting value in target memories, which correspond to the host port and the target endpoint port from among the first memories, under control of the target endpoint device, transfer a memory read request received from the host, to the target endpoint device under a condition defined by the self-setting value, and transfer the data of the boot-up instruction output from the target endpoint device in response to the memory read request, to the host.

According to yet another aspect of one or more example embodiments, there is provided an electronic device comprising a processor device configured to perform a booting operation based on a boot-up instruction; and an endpoint device configured to store data of the boot-up instruction, and store setting information associated with a condition in which communication with the processor device is performed, wherein the endpoint device is further configured to store the setting information having a self-setting value before storing the setting information based on a command from the processor device, and provide the data of the boot-up instruction to the processor device in response to a memory read request received from the processor device, under a condition defined by the self-setting value.

According to yet another aspect of one or more example embodiments, there is provided an electronic device comprising a processor device configured to perform, at power-up, a booting operation after reading and processing a boot-up instruction; and an endpoint device configured to, at power-up, perform a self-configuration operation to provide the boot-up instruction to the processor device.

BRIEF DESCRIPTION OF THE DRAWINGS

The above and other aspects will become apparent from the following description with reference to the following figures, wherein like reference numerals refer to like parts throughout the various figures unless otherwise specified, and wherein.

DETAILED DESCRIPTION OF EXAMPLE EMBODIMENTS

Below, example embodiments will now be more fully described with reference to accompanying drawings so that those skilled in the art can readily comprehend the inventive concepts.

Figure 1:
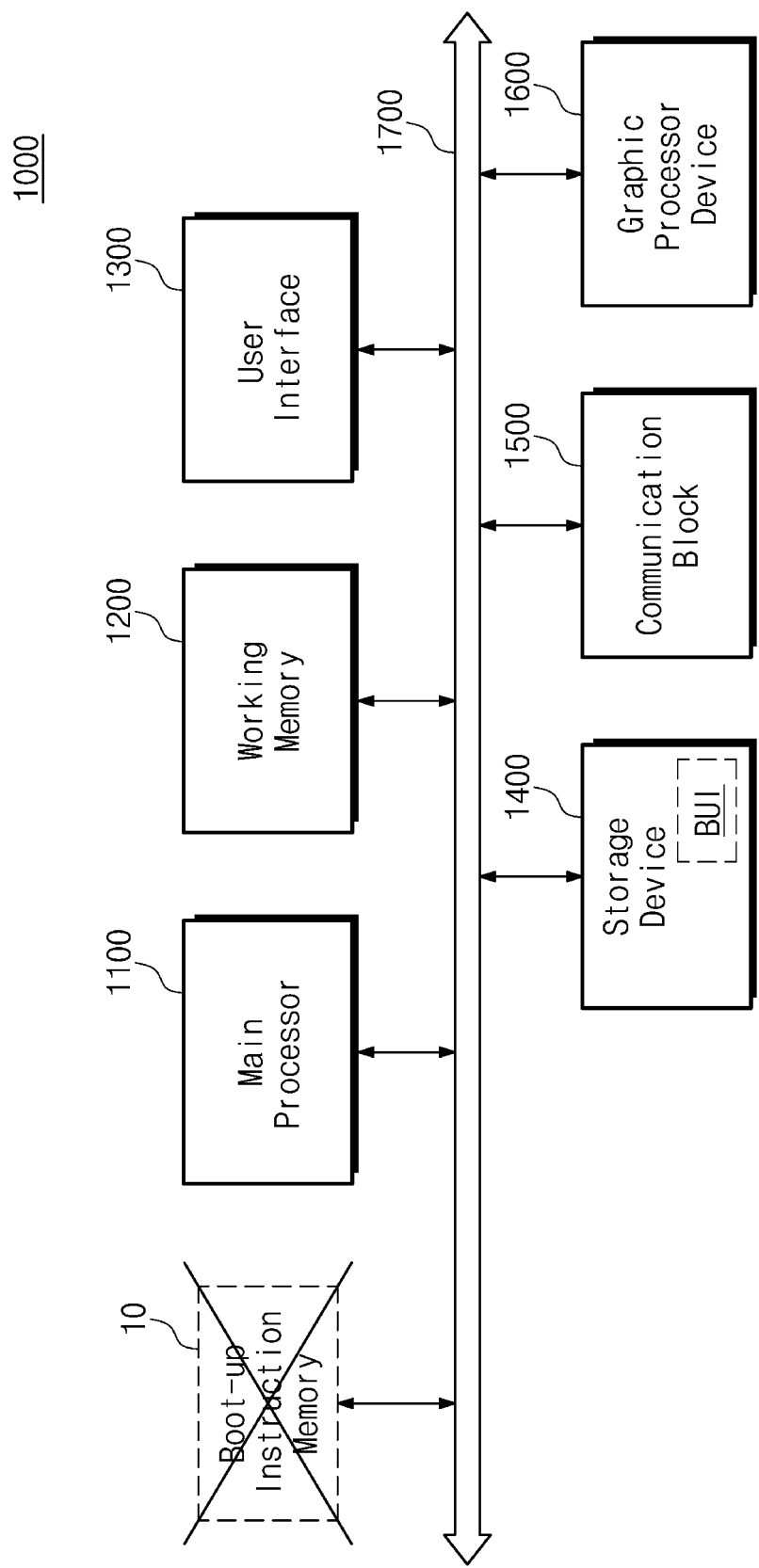
FIG. 1 is a block diagram illustrating a computing device that includes electronic devices according to example embodiments.

FIG. 1 is a block diagram illustrating a computing device that includes electronic devices according to example embodiments.

Referring to FIG. 1, a computing device 1000 may include a main processor 1100, a working memory 1200, a user interface 1300, a storage device 1400, a communication block 1500, a graphic processor device 1600, and a bus 1700. For example, the computing device 1000 may be one of various electronic devices such as, but not limited to, a desktop computer, a laptop computer, a tablet computer, a video game console, a workstation, a server, and/or the like.

The main processor 1100 may control overall operations of the computing device 1000. The main processor 1100 may be configured to process various kinds of arithmetic operations and/or logical operations.

To this end, the main processor 1100 may be implemented in a special-purpose logic circuit (e.g., a field programmable gate array (FPGA), application specific integrated chips (ASICs), and/or the like) including one or more processor cores. The main processor 1100 may execute an instruction set of a program code by means of the processor cores. For example, the main processor 1100 may include a general-purpose processor, a special-purpose processor, and/or an application processor.

The working memory 1200 may temporarily store data that is used in an operation of the computing device 1000. For example, the working memory 1200 may store data processed or to be processed by the main processor 1100. For example, the working memory 1200 may include volatile memories such as a static random access memory (SRAM), a dynamic RAM (DRAM), a synchronous DRAM (SDRAM), and/or the like.

The user interface 1300 may arbitrate communication between a user and the computing device 1000 under control of the main processor 1100. For example, the user interface 1300 may process inputs from a keyboard, a mouse, a keypad, a button, a touch panel, a touch screen, a touch pad, a touch ball, a camera, a microphone, a gyroscope sensor, and/or a vibration sensor, etc. In addition, the user interface 1300 may process outputs that are to be provided to a display device, a speaker, and/or a motor, etc.

The storage device 1400 may store data regardless of power being supplied. For example, the storage device 1400 may include at least one of nonvolatile memories such as a phase-change RAM (PRAM), a magneto-resistive RAM (MRAM), a resistive RAM (ReRAM), a ferro-electric RAM (FRAM), and/or the like. For example, the storage device 1400 may include a storage medium such as a solid state drive (SSD), a hard disk drive (HDD), and/or the like.

The communication block 1500 may communicate with an external device/system of the computing device 1000 under control of the main processor 1100. For example, the communication block 1500 may communicate with the external device/system of the computing device 1000 in compliance with at least one of various wired communication protocols, such as Ethernet, transfer control protocol/Internet protocol (TCP/IP), universal serial bus (USB), Firewire, and/or the like, and/or at least one of various wireless communication protocols, such as long term evolution (LTE), worldwide interoperability for microwave access (WiMax), global system for mobile communications (GSM), code division multiple access (CDMA), Bluetooth, near field communication (NFC), wireless fidelity (Wi-Fi), radio frequency identification (RFID), and/or the like.

The graphic processor device 1600 may include a plurality of processor cores (e.g., graphic processing units). The processor cores included in the graphic processor device 1600 may quickly process graphic data in parallel. For example, the graphic processor device 1600 may process various graphic operations, such as pixel shader, super-sampling, color space transform, and/or the like, by using the processor cores.

Each of the main processor 1100, the working memory 1200, the user interface 1300, the storage device 1400, the communication block 1500, and the graphic processor device 1600 may be implemented in a device at a circuit level, a chip level, and/or a package level so as to be mounted in the computing device 1000. Alternatively, each of the processor device 1100, the working memory 1200, the storage device 1300, the communication block 1400, the user interface 1500, and the graphic processor device 1600 may be implemented in an independent electronic device so as to be assembled within the computing device 1000. The mounted or assembled components may be connected to one another through the bus 1700.

The bus 1700 may provide a communication path between the components of the computing device 1000. The components of the computing device 1000 may exchange data with one another based on a bus format of the bus 1700. For example, the bus format may include at least one of various communication protocols, such as peripheral component interconnect (PCI), PCI express (PCIe), nonvolatile memory express (NVMe), small computer system interface (SCSI), advanced technology attachment (ATA), serial ATA (SATA), parallel ATA (PATA), serial attached SCSI (SAS), universal flash storage (UFS), and/or the like.

The main processor 1100 may initiate a booting operation in response to a start of power being supplied from a power supply. The booting operation may be performed to allow the computing device 1000 and components thereof to enter a state in which the computing device 1000 and the components thereof operate appropriately. For example, the power may be supplied to the components of the computing device 1000 from a battery (not illustrated) included in the computing device 1000 and/or an external power source (not illustrated) of the computing device 1000.

When the booting operation starts, the main processor 1100 may first read and process a boot-up instruction (BUI). The main processor 1100 may perform the booting operation based on the boot-up instruction BUI. The boot-up instruction BUI may include basic instruction(s) that allow the main processor 1100 to enter a state in which the main processor 1100 may process various operations and identify other components. For example to facilitate better understanding, the boot-up instruction BUI may be associated with at least one of a basic input/output system (BIOS), an extensible firmware interface (EFI), a unified EFI (UEFI), and/or the like, but the example embodiments are not limited thereto.

The main processor 1100 may identify and recognize other components of the computing device 1000 while processing the boot-up instruction BUI. For example, the main processor 1100 may determine which components are connected, which type/model the connected component is, how to set a condition for communication with the connected component, and/or the like. For example to facilitate better understanding, such determination may correspond to an enumeration/configuration operation that is defined in the PCI/PCIe communication protocol. However, the example embodiments are not limited thereto.

After processing the boot-up instruction BUI, the main processor 1100 may prepare a kernel of an operating system based on a boot loader. The main processor 1100 may load the operating system on the prepared kernel. In addition, the main processor 1100 may allow other components to prepare to operate such that other components may provide services suitably. The booting operation may be completed according to the above-described processes.

The main processor 1100 may read and process the boot-up instruction BUI, both before and while handling the boot loader and the operating system. Completion of the booting operation may be delayed if it takes a long time to read and process the boot-up instruction BUI. Accordingly, to quickly read and process the boot-up instruction BUI may bring benefits into the booting operation.

In some cases, the computing device 1000 may include a boot-up instruction memory 10. For example, the boot-up instruction memory 10 may include an additional memory such as a read-only memory (ROM), a flash memory, and/or the like. As such, the boot-up instruction memory 10 may store a boot-up instruction (e.g., BIOS, EFI, and/or the like) for the main processor 1100, and may provide the main processor 1100 with the boot-up instruction in response to a request of the main processor 1100.

However, in most cases, the boot-up instruction memory 10 may have slow operation speed, and may occupy an additional area on the computing device 1000. In addition, since the boot-up instruction memory 10 accompanies a complementary metal-oxide semiconductor (CMOS) device (or chip) associated with managing the boot-up instruction memory 10 as well as a battery provided to retain data of the boot-up instruction memory 10, the area of the computing device 1000 becomes larger. Further, when there is a need to update the boot-up instruction, it is necessary to replace the boot-up instruction memory 10 and the CMOS device (or chip), thereby causing an increase in costs and inconvenience.

Accordingly, in example embodiments, the computing device 1000 may omit the boot-up instruction memory 10. Instead, the storage device 1400 may store data of the boot-up instruction BUI. In the example embodiments, the storage device 1400 may provide the boot-up instruction BUI to the main processor 1100 in response to a request of the main processor 1100.

In most cases, operation speed of the storage device 1400 may be much faster than that of the boot-up instruction memory 10. Accordingly, the booting operation may be quickly performed when the main processor 1100 reads the boot-up instruction BUI from the storage device 1400. In addition, since the boot-up instruction memory 10, the CMOS device (or chip), and the battery may be omitted from the computing device 1000, the area of the computing device 1000 and costs for implementing the computing device 1000 may be reduced. Further, the boot-up instruction BUI may be easily updated by newly installing a program code stored in the storage device 1400.

However, before the main processor 1100 reads the boot-up instruction BUI, the main processor 1100 may not identify or recognize the storage device 1400 yet. The reason is because the main processor 1100 may identify and recognize the storage device 1400 after reading the boot-up instruction BUI. Accordingly, before the main processor 1100 reads the boot-up instruction BUI, the main processor 1100 may not be ready to communicate with the storage device 1400 yet and may not read the boot-up instruction BUI from the storage device 1400 immediately.

Accordingly, in example embodiments, the storage device 1400 may perform a "self-configuration operation" to provide the boot-up instruction BUI to the main processor 1100. In the self-configuration operation, the storage device 1400 may enter a state for communicating with the main processor 1100 by itself. The main processor 1100 may receive the boot-up instruction BUI from the storage device 1400 that performs the self-configuration operation. Such the operations will be described with reference to FIGS. 2 to 15.

First, example embodiments to which the PCI/PCIe communication protocol is employed will be described with reference to FIGS. 2 to 13. In these example embodiments, a connection structure between electronic devices that communicate with one another according to the PCI/PCIe communication protocol may be referred to as a "PCI/PCIe fabric". However, the example embodiments are provided to facilitate better understanding, and are not intended to limit the example embodiments. The example embodiments may be applied to any other communication protocol(s) other than the PCI/PCIe communication protocol based on the following descriptions.

Figure 2:
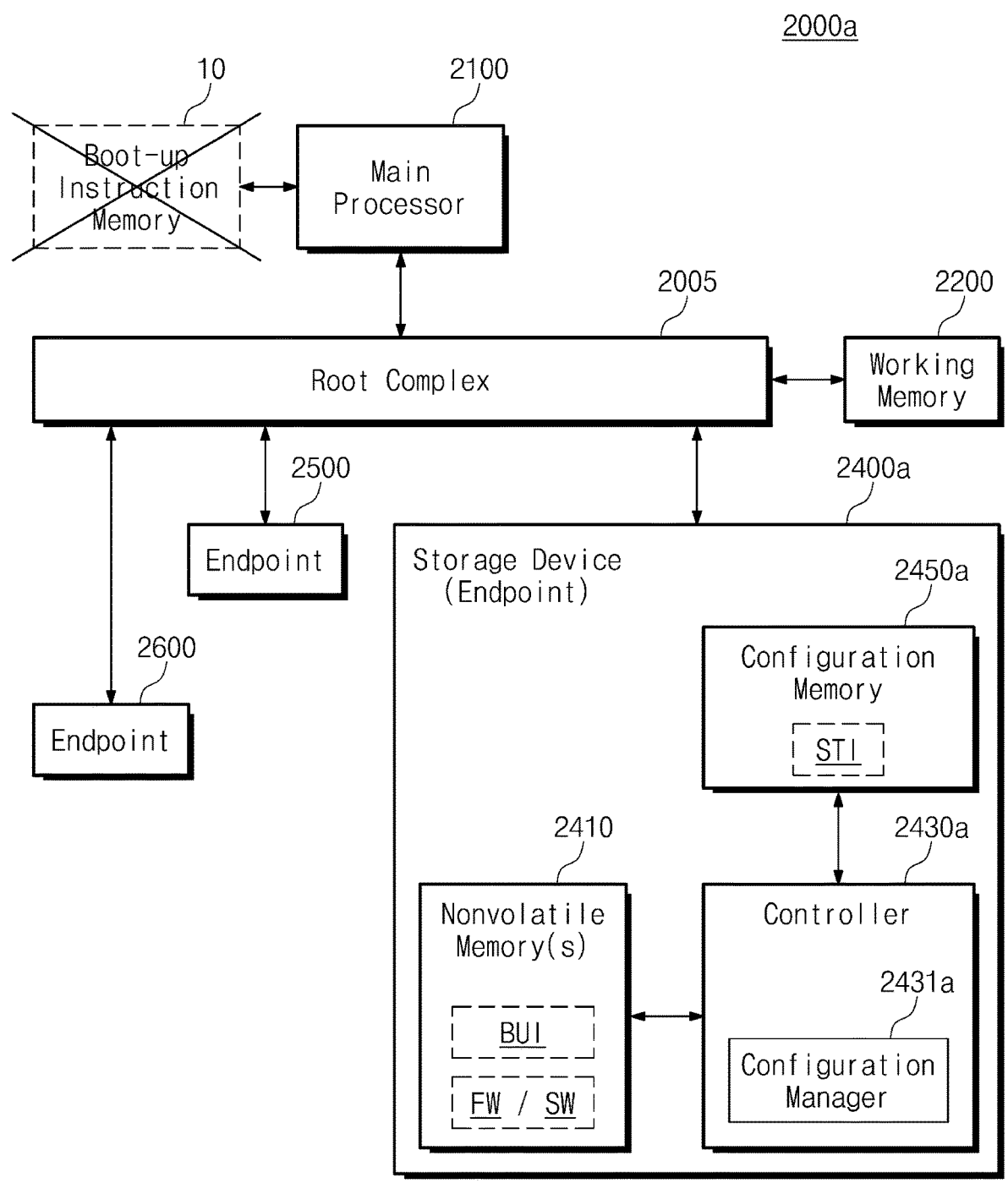
FIG. 2 is a block diagram illustrating an example connection structure between the electronic devices of FIG. 1.

FIG. 2 is a block diagram illustrating an example connection structure between electronic devices of FIG. 1. For example, the computing device 1000 of FIG. 1 may employ a PCI/PCIe fabric 2000a to connect electronic devices (e.g., the main processor 1100, the working memory 1200, the storage device 1400, the communications block 1500, and the graphic processor device 1600).

For example, the PCI/PCIe fabric 2000a may include a main processor 2100, a working memory 2200, and endpoint devices 2400a, 2500, and 2600. Meanwhile, in the example embodiments, the PCI/PCIe fabric 2000a may omit the boot-up instruction memory 10 as described with reference to FIG. 1.

The main processor 2100 and the working memory 2200 may correspond to the main processor 1100 and the working memory 1200 of FIG. 1, respectively. Each of the endpoint devices 2400a, 2500, and 2600 may provide service(s) for the main processor 2100 at an endpoint of the PCI/PCIe fabric 2000a. For example, the endpoint device 2400a is assumed as being a storage device corresponding to the storage device 1400 of FIG. 1. Below, the endpoint device 2400a may be referred to as a "storage device". Each of the endpoint devices 2500 and 2600 may correspond to the storage device 1400, the communication block 1500, or the graphic processor device 1600 of FIG. 1, or any other type of an endpoint device. FIG. 2 shows three endpoint devices 2400a, 2500, and 2600, but the number of endpoint devices may be variously changed or modified.

The main processor 2100, the working memory 2200, and the endpoint devices 2400a, 2500, and 2600 may be interconnected through a root complex 2005. The root complex 2005 may arbitrate communication between the main processor 2100, the working memory 2200, and the endpoint devices 2400a, 2500, and 2600. For example, the root complex 2005 may manage communication timing, a communication sequence, a communication condition, and/or the like, between the main processor 2100, the working memory 2200, and the endpoint devices 2400a, 2500, and 2600. The root complex 2005 may be printed or mounted on a main board of the computing device 1000, or may be implemented with a separate device.

The storage device 2400a may include at least one nonvolatile memory 2410, a controller 2430a, and a configuration memory 2450a. The nonvolatile memory 2410 may store data or may output the stored data. For example, the nonvolatile memory 2410 may include at least one of a flash memory, a PRAM, an MRAM, a ReRAM, a FRAM, and/or the like.

The nonvolatile memory 2410 may store data of the boot-up instruction BUI for the main processor 2100. The nonvolatile memory 2410 may store data of a program code of firmware (FW) and/or software (SW). The program code of the firmware (FW) and/or the software (SW) may be executed by the controller 2430a to operate the storage device 2400a. Alternatively, the program code of the firmware or the software (e.g., an operating system) may be executed by the main processor 2100 to operate the computing device 1000 that employs the PCI/PCIe fabric 2000a.

The controller 2430a may control overall operations of the storage device 2400a. In response to a request from an external device (e.g., the main processor 2100), the controller 2430a may control the nonvolatile memory 2410 such that the nonvolatile memory 2410 stores or outputs data. For example, the controller 2430a may provide the data of the boot-up instruction BUI to the main processor 2100, in response to a memory read request received from the main processor 2100. For example, an external device (e.g., the main processor 2100) that requests a service to the controller 2430a may be referred to as a "host". Besides, the controller 2430a may perform various operations including managing an operation condition of the storage device 2400a, checking an error of data stored in the nonvolatile memory 2410, and/or the like.

The controller 2430a may include a hardware circuit that is designed to perform a specific operation described above and/or to be described below. The controller 2430a may execute the program code of the firmware (FW) and/or the software (SW) that is designed to perform a specific operation described above and/or to be described below. The controller 2430a may include one or more processor cores that may execute and process an instruction set of the program code.

The configuration memory 2450a may store setting information STI. The setting information STI may include information associated with a condition in which communication with the external device (e.g., the main processor 2100) is performed. For example, the configuration memory 2450a may be associated with a "configuration space" that is defined by the PCI/PCIe communication protocol. The storage device 2400a and the controller 2430a may communicate with an external device under a communication condition defined based on the setting information STI.

For example, the setting information STI may include information of a signal address range. The storage device 2400a and the controller 2430a may receive and process an input (e.g., a command, a request, a query, and data from a host) having a signal address that is included in the signal address range of the setting information STI.

For example, the signal address range may be defined based on an upper limit value and a lower limit value. In this example, the storage device 2400a and the controller 2430a may receive and process an input having a signal address between the upper limit value and the lower limit value. As another example, the signal address range may be defined based on the upper limit value. In this example, the storage device 2400a and the controller 2430a may receive and process an input having a signal address that is equal to or below the upper limit value. To communicate with the storage device 2400a, the external device (e.g., the main processor 2100) may output a signal/data/packet having a signal address that may be processed by the storage device 2400a. However, these examples are provided to facilitate better understanding, and the example embodiments are not limited thereto.

For example, in the enumeration/configuration operation, the main processor 2100 may recognize that the storage device 2400a is connected. To communicate with the storage device 2400a, the main processor 2100 may provide an enumeration/configuration command to the storage device 2400a. The storage device 2400a may store the setting information STI in the configuration memory 2450a in response to the enumeration/configuration command. After the enumeration/configuration operation is completed, the external device (e.g., the main processor 2100) may communicate with the storage device 2400a with reference to the setting information STI.

For example, the configuration memory 2450a may include a memory such as a register that stores the setting information STI. However, the example embodiments are not limited thereto. The configuration memory 2450a may include one or more of various types of memories such as a flash memory, a PRAM, an MRAM, a ReRAM, a FRAM, an electrically erasable/programmable ROM (EEPROM), and/or the like.

The controller 2430a may include a configuration manager 2431a. The configuration manager 2431a may perform the self-configuration operation of the storage device 2400a. In the example embodiments, before the controller 2430a provides the boot-up instruction BUI to the main processor 2100 in response to the "memory read request" from the main processor 2100, the configuration manager 2431a may control the self-configuration operation to enable communication with the main processor 2100. According to the self-configuration operation, the storage device 2400a may store the setting information STI having a "self-setting value" by itself, before storing the setting information STI based on the enumeration/configuration command from the main processor 2100.

The self-setting value may include a value of the setting information STI that is set by the storage device 2400a without a command from the main processor 2100. In the self-configuration operation, the configuration manager 2431a may store the setting information STI having the self-setting value in the configuration memory 2450a, to define a condition in which communication with the main processor 2100 is performed.

Accordingly, even though the main processor 2100 does not read the boot-up instruction BUI yet and does not perform the enumeration/configuration operation, the main processor 2100 may communicate with the storage device 2400a based on the setting information STI having the self-setting value. In addition, under the condition defined by the self-setting value, the controller 2430a may provide the data of the boot-up instruction BUI to the main processor 2100 in response to the memory read request from the main processor 2100.

To perform the self-configuration operation, the configuration manager 2431a may be executed on the controller 2430a by executing the program code of the firmware (FW) and/or the software (SW). Alternatively, the configuration manager 2431a may be implemented with a hardware circuit. In some cases, the configuration manager 2431a may be implemented in a hybrid form of hardware and software.

Figure 3:
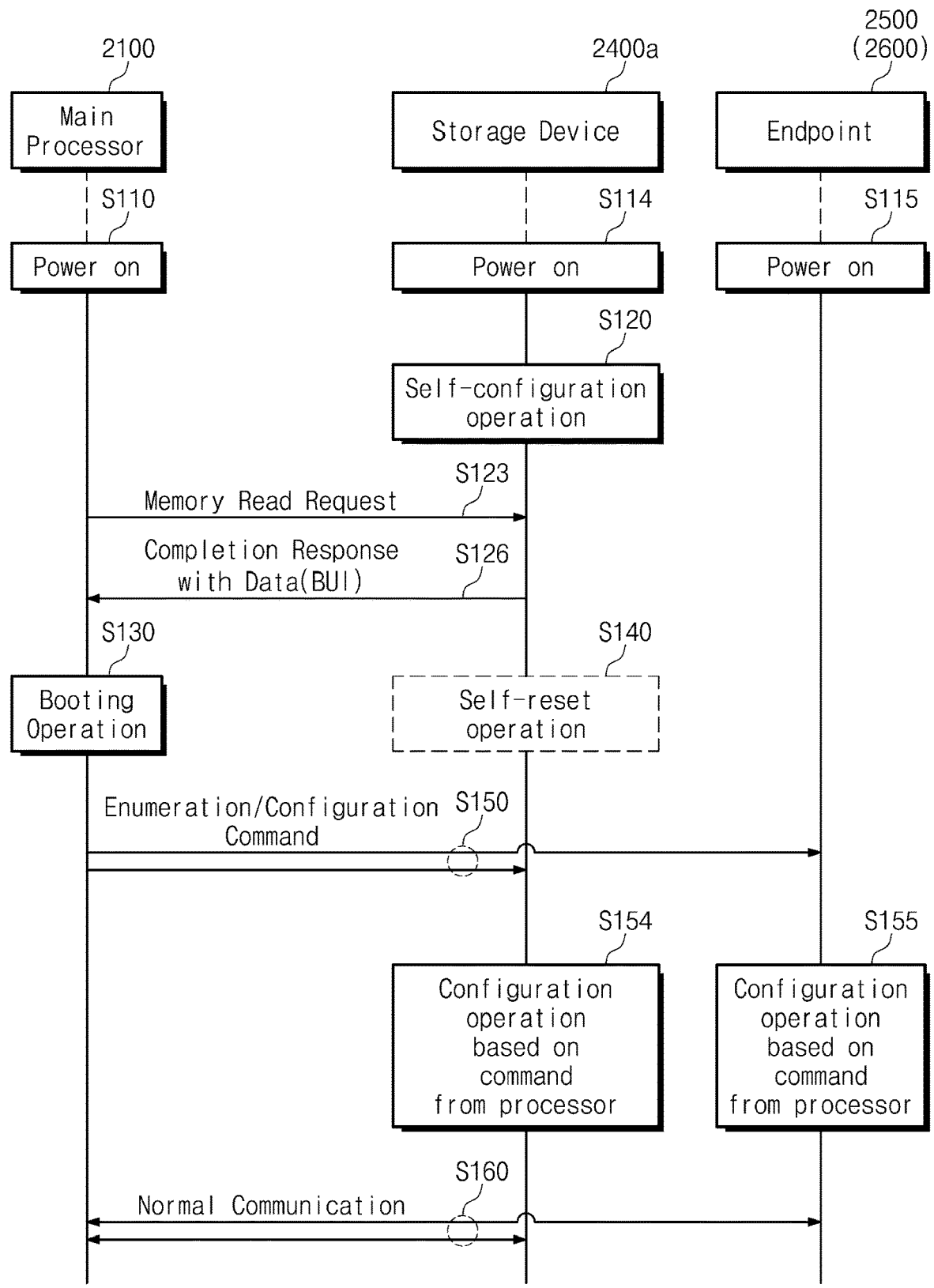
FIG. 3 is a flowchart describing example communication between the electronic devices of the connection structure of FIG. 2.

FIG. 3 is a flowchart describing example communications between electronic devices of the connection structure of FIG. 2.

In operations S110 and S114, power supply to the main processor 2100 and the storage device 2400a may start, respectively, and in operation S115, power supply to the endpoint devices 2500 and 2600 may start. The power may be supplied from a battery outside the PCI/PCIe fabric 2000a or any other power source. In some example embodiments, the power supply to the main processor 2100, the storage device 2400a, and the endpoint devices 2500 and 2600 may be provided substantially simultaneously In operation S120, the storage device 2400a may perform the self-configuration operation. Before the main processor 2100 provides the enumeration/configuration command to the storage device 2400a, the storage device 2400a may perform the self-configuration operation to enable communication with the main processor 2100. In the self-configuration operation, the storage device 2400a may store the setting information STI having the self-setting value in the configuration memory 2450a. The self-configuration operation will be further described with reference to FIG. 4.

In operation S123, the main processor 2100 may provide the memory read request to the storage device 2400a. In operation S126, the storage device 2400a may provide a completion response together with data to the main processor 2100. The data provided to the main processor 2100 may include the boot-up instruction BUI. In operation S130, the main processor 2100 may perform the booting operation based on the boot-up instruction BUI received in operation S126.

In the example embodiments, the main processor 2100 may communicate with the storage device 2400a before performing the booting operation and the enumeration/configuration operation. The communication between the main processor 2100 and the storage device 2400a may be performed under a condition that is defined by the setting information STI having the self-setting value. Accordingly, the main processor 2100 may receive the boot-up instruction BUI from the storage device 1400 without requiring an additional boot-up instruction memory 10.

In operation S140, the storage device 2400a may perform a self-reset operation. In the self-reset operation, the storage device 2400a may release the setting information STI having the self-setting value, and may reset the configuration memory 2450a. The self-setting value may correspond to the setting information STI that is temporarily set to provide the boot-up instruction BUI to the main processor 2100. Accordingly, after the boot-up instruction BUI is provided to the main processor 2100, the storage device 2400a may perform the self-reset operation to release and reset the setting information STI having the self-setting value. However, in some cases, the setting information STI having the self-setting value may be suitable to continue to communicate with the main processor 2100. In this case, operation S140 may be omitted. The self-reset operation will be further described with reference to FIG. 7.

In operation S150, the main processor 2100 may provide the enumeration/configuration command to each of the storage device 2400a and the endpoint devices 2500 and 2600. When the main processor 2100 recognizes that the storage device 2400a and the endpoint devices 2500 and 2600 are connected, the main processor 2100 may provide the enumeration/configuration command to each of the recognized storage device 2400a and the recognized endpoint devices 2500 and 2600.

In operation S154, the storage device 2400a may perform a configuration operation based on the command received in operation S150. In the configuration operation, the storage device 2400a may store the setting information STI in the configuration memory 2450a. In operation S155, each of the endpoint devices 2500 and 2600 may perform the configuration operation (e.g., storing the setting information STI) based on the command received in operation S150. In some cases, the operations S154 and S155 may be performed substantially simultaneously.

In operation S160, normal communication may be performed between the main processor 2100 and each of the storage device 2400a and the endpoint devices 2500 and 2600. For example, when the PCI/PCIe fabric 2000a is employed, the main processor 2100 may communicate with the storage device 2400a and the endpoint devices 2500 and 2600 in compliance with the PCI/PCIe communication protocol. As such, the communication may be performed under a condition that is defined by the setting information STI stored in operations S154 to S155. The enumeration/configuration operation and the normal communication will be further described with reference to FIG. 8.

Figure 4:
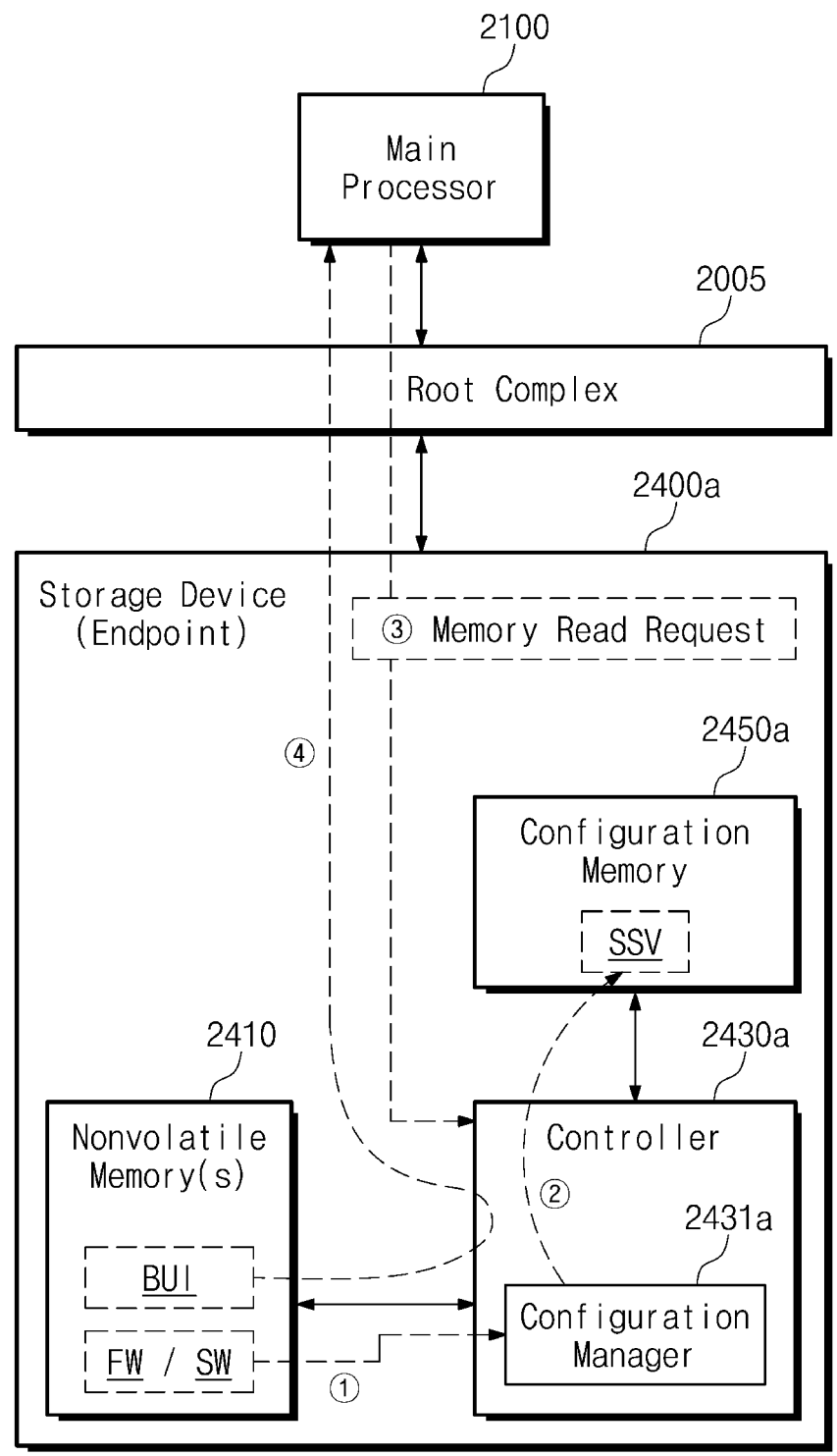
FIG. 4 is a conceptual diagram describing an example self-configuration operation that is performed in the connection structure of FIG. 2.

FIG. 4 is a conceptual diagram describing an example self-configuration operation that is performed in the connection structure of FIG. 2.

After power supply to the storage device 2400a starts, the controller 2430a may execute a program code of firmware (FW) and/or software (SW). Accordingly, the controller 2430a may execute the configuration manager 2431a (operation ①).

The configuration manager 2431a may be executed to perform the self-configuration operation. In the self-configuration operation, the configuration manager 2431a may store the setting information STI having a self-setting value SSV in the configuration memory 2450a (operation ②)).

As described above, the setting information STI may store information of a signal address range. In this case, the self-setting value SSV may include at least one of an upper limit value and/or a lower limit value that defines the signal address range.

For example, the program code of the firmware (FW) and/or the software (SW) may include a code associated with at least one of the upper limit value and/or the lower limit value of the signal address range. The configuration manager 2431a may read the upper limit value and/or the lower limit value from the program code of the firmware (FW) and/or the software (SW). The configuration manager 2431a may store the read value(s) in the configuration memory 2450a as the self-setting value SSV.

Afterwards, the controller 2430a may receive an input (e.g., a command, a request, a query, data, a packet, and/or the like) having a signal address included in the signal address range that is indicated by the self-setting value SSV, from the main processor 2100. Accordingly, the controller 2430a may receive the memory read request having a signal address between the upper limit value and the lower limit value of the signal address range, from the main processor 2100 (operation ③)).

For example, the main processor 2100 may provide the memory read request to the storage device 2400a in response to start of power supply. Alternatively, since it takes some time for the configuration manager 2431a to perform the self-configuration operation (e.g., to store the setting information STI having the self-setting value SSV in the configuration memory 2450a), the main processor 2100 may provide the memory read request to the storage device 2400a after a reference time elapses from start of power supply.

The controller 2430a may read the boot-up instruction BUI from the nonvolatile memory 2410 in response to the memory read request. The controller 2430a may provide data of the read boot-up instruction BUI to the main processor 2100 (operation ④)).

In some example embodiments, the controller 2430a may execute the configuration manager 2431a in response to start of power supply to the storage device 2400a. Accordingly, the configuration manager 2431a may store the setting information STI having the self-setting value SSV in the configuration memory 2450a in response to start of power supply.

In some example embodiments, the storage device 2400a may further communicate with the main processor 2100 in compliance with a sideband interface protocol which is different from a main interface protocol (as will be described with reference to FIG. 9). In such example embodiments, the controller 2430a may execute the configuration manager 2431a in response to a preceding request received from the main processor 2100 in compliance with the sideband interface protocol. Accordingly, the configuration manager 2431a may store the setting information STI having the self-setting value SSV in the configuration memory 2450a in response to the preceding request.

In some example embodiments, in an initialized state, the configuration memory 2450a may be configured to initially store the setting information STI that allows all inputs to be received (i.e., a fully opened state). For example, the main processor 2100 may output a signal having a signal address between a maximum value and a minimum value. The configuration memory 2450a may store the setting information STI for receiving any input having a signal address between the maximum value and the minimum value. In such example embodiments, the controller 2431a may execute the configuration manager 2431a in response to the memory read request from the main processor 2100, regardless of a signal address of the memory read request. The configuration manager 2431a may store the setting information STI having any suitable self-setting value SSV in the configuration memory 2450a in response to the memory read request (for example, in such example embodiments, operation S123 of FIG. 3 may be performed before operation S120 of FIG. 3).

Figure 5:
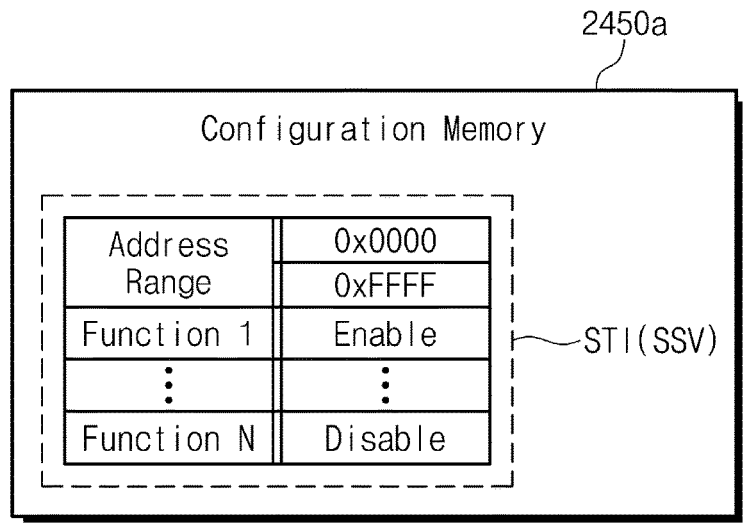
FIG. 5 is a conceptual diagram illustrating an example configuration of setting information that may be stored in a configuration memory of the connection structure of FIG. 2.

FIG. 5 is a conceptual diagram illustrating an example configuration of setting information that may be stored in a configuration memory of the connection structure of FIG. 2.

The configuration memory 2450a may store the setting information STI. According to the self-configuration operation (see FIG. 3), the setting information STI may have the self-setting value SSV. When the setting information STI includes information of the signal address range, the self-setting value SSV may include at least one of an upper limit value and/or a lower limit value that defines the signal address range.

For example, when the upper limit value is "0xFFFF" and the lower limit value is "0x0000", the controller 2430a may receive and process an input that has a signal address included in a signal address range that is defined by "0xFFFF" and "0x0000" (e.g., between "0xFFFF" and "0x0000"). In some cases, the self-setting value SSV may include only the upper limit value of "0xFFFF" to define the signal address range. In this case, the controller 2430a may receive and process an input that has a signal address of "0xFFFF" or below "0xFFFF".

The upper limit value and/or the lower limit value indicated by the self-setting value SSV may be selected to be suitable to receive the memory read request. In some cases, the self-setting value SSV may include an upper limit value and/or a lower limit value that is previously agreed with a vendor of the main processor 2100. The controller 2430a may receive and process an input that has a signal address included in a signal address range that is defined by the upper limit value and/or the lower limit value of the self-setting value SSV. Accordingly, the self-setting value SSV may be selected such that the signal address range includes a signal address of the memory read request from the main processor 2100.

For example, the setting information STI may include control information that enables/disables specific communication function(s). In this case, the self-setting value SSV may further include control information value(s) corresponding to the specific communication function(s). Besides, the setting information STI (and/or the self-setting value SSV) may include a variety of information such as identifier information used to identify an endpoint device, status information indicating an operation status of the endpoint device, and/or the like. The main processor 2100 may output a signal/data/packet which is allowed based on the setting information STI, to communicate with the storage device 2400a.

Figure 6:
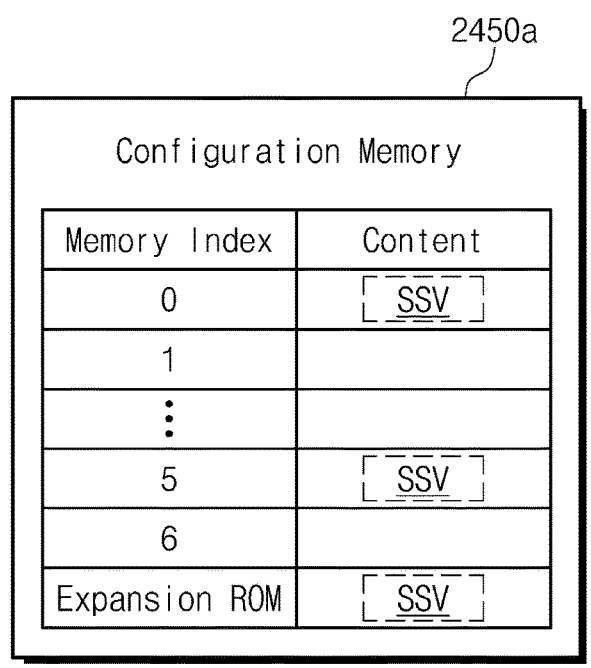
FIG. 6 is a conceptual diagram illustrating example implementations for storing a self-setting value in a configuration memory of the connection structure of FIG. 4.

FIG. 6 is a conceptual diagram illustrating example implementations for storing a self-setting value in a configuration memory of FIG. 4.

The configuration memory 2450*a* may include a plurality of memory areas. The memory areas may provide different functions. The memory areas may be distinguished based on different memory indexes.

For example, an external device (e.g., the main processor 2100) may refer to a memory area having a memory index of "0" or "1" (hereinafter referred to as a "first area") for normal communication between the external device and the controller 2430*a*. In more detail, in operation S160 of FIG. 3, the first area may store the setting information STI that is referred to for communication with the main processor 2100. Meanwhile, a memory area having a memory index of "5" or "6" (hereinafter referred to as a "second area") may include a reserved area that is not referred to during the normal communication. In some cases, the configuration memory 2450*a* may be associated with an expansion ROM area that is referred to in connection with the PCI/PCIe communication protocol.

In some example embodiments, the setting information STI having the self-setting value SSV may be stored in the first area (e.g., a memory area having a memory index of "0"). In such example embodiments, the setting information STI having the self-setting value SSV may be reset in operation S140 of FIG. 3. Accordingly, the normal communication between the main processor 2100 and the controller 2430*a* may not be influenced by the self-setting value SSV.

In some example embodiments, the setting information STI having the self-setting value SSV may be stored in the second area (e.g., a memory area having a memory index of "5"). Alternatively, the configuration memory 2450*a* may open the expansion ROM area under control of the controller 2430*a*, and the expansion ROM area may store the setting information STI having the self-setting value SSV. In such example embodiments, even though the self-reset operation for the configuration memory 2450*a* is not performed, the normal communication between the main processor 2100 and the controller 2430*a* may not be influenced by the self-setting value SSV.

Figure 7:
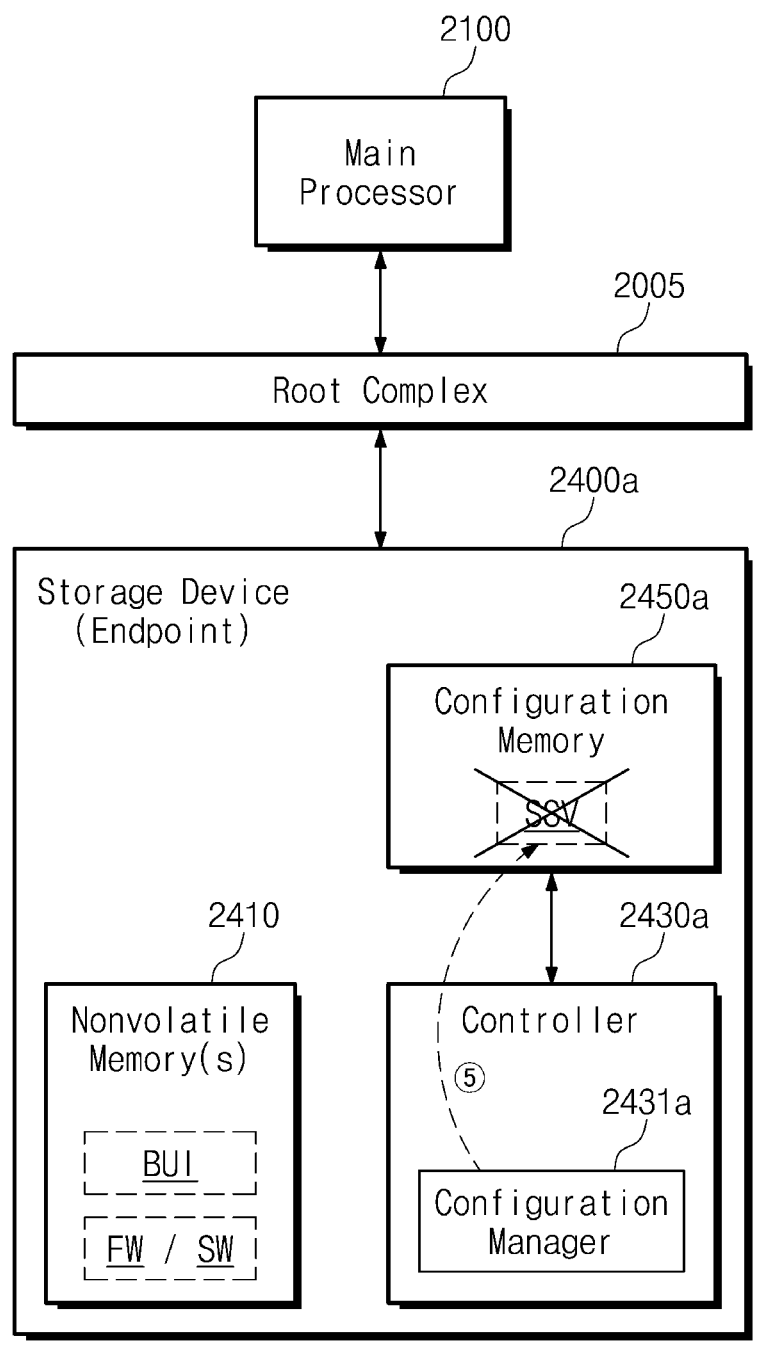
FIG. 7 is a conceptual diagram describing an example self-reset operation that is performed in the connection structure of FIG. 2.

FIG. 7 is a conceptual diagram describing an example self-reset operation that is performed in a connection structure of FIG. 2.

The configuration manager 2431*a* of the controller 2430*a* may determine whether the data of the boot-up instruction BUI is completely provided to an external device (e.g., the main processor 2100). The configuration manager 2431*a* may perform the self-reset operation when it is determined that the data of the boot-up instruction BUI is completely provided to the main processor 2100.

In the self-reset operation, the configuration manager 2431*a* may release and reset the setting information STI having the self-setting value SSV (operation ⑤). The self-setting value SSV may not be referred to any longer, when it is determined that the data of the boot-up instruction BUI is completely provided to the main processor 2100. Accordingly, the configuration manager 2431*a* may release the setting information STI having the self-setting value SSV to reset the configuration memory 2450*a*. For example, "releasing" may include deleting the self-setting value SSV itself and/or disconnecting a reference link for the self-setting value SSV.

In some example embodiments, the configuration manager 2431*a* may identify information associated with the amount of the data of the boot-up instruction BUI in advance (e.g., in advance before the storage device 2400*a* operates).

In addition, the configuration manager 2431*a* may monitor the amount of the data of the boot-up instruction BUI that is output from the storage device 2400*a*, the nonvolatile memory 2410, or the controller 2430*a*. The configuration manager 2431*a* may determine whether the data of the boot-up instruction BUI is completely provided to the main processor 2100, based on the monitored data amount. For example, when the monitored data amount is greater than or equal to the previously identified data amount (i.e., when the whole portion of the data of the boot-up instruction BUI is output to the main processor 2100), the configuration manager 2431*a* may determine that the data of the boot-up instruction BUI is completely provided to the main processor 2100.

In some example embodiments, the main processor 2100 may monitor the amount of the data of the boot-up instruction BUI received from the storage device 2400*a*. When the whole portion of the data of the boot-up instruction BUI is completely received, the main processor 2100 may transmit a completion response or an enumeration/configuration command to the storage device 2400*a*. The configuration manager 2431*a* may determine that the data of the boot-up instruction BUI is completely provided to the main processor 2100, in response to the completion response or the enumeration/configuration command from the main processor 2100 (when the enumeration/configuration command is used to inform that the boot-up instruction BUI is completely received, operation S150 of FIG. 3 may be performed prior to operation S140 of FIG. 3).

In some example embodiments, the storage device 2400*a* may further communicate with the main processor 2100*a* in compliance with a sideband interface protocol which is different from the main interface protocol (e.g., PCIe) (as will be described with reference to FIG. 9). In such example embodiments, the main processor 2100 may transmit the completion response to the storage device 2400*a* in compliance with the sideband interface protocol, to inform that the boot-up instruction BUI is completely received. The configuration manager 2431*a* may determine that the data of the boot-up instruction BUI is completely provided to the main processor 2100, in response to the completion response.

Figure 8:
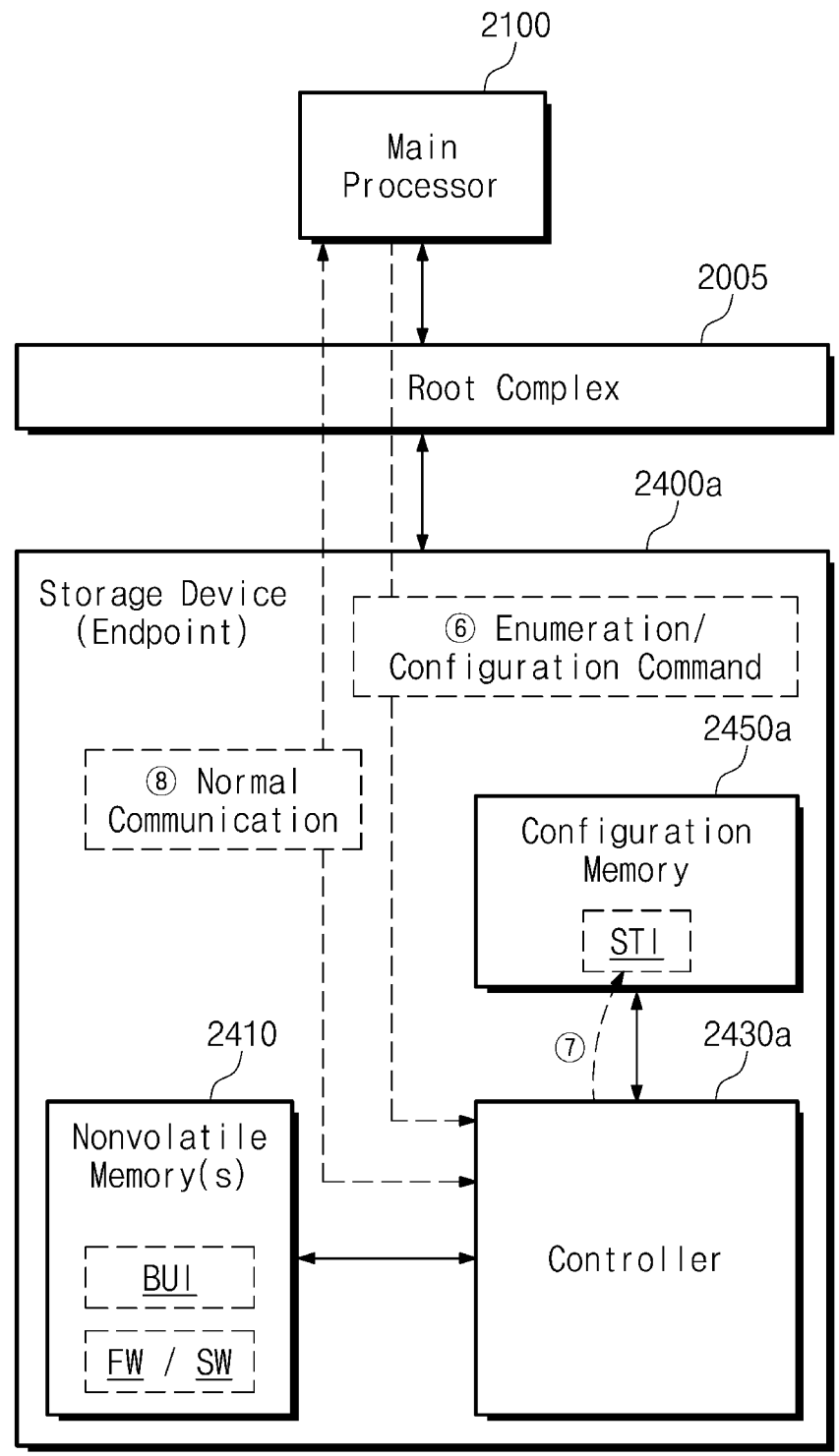
FIG. 8 is a conceptual diagram describing example normal communication that is performed in the connection structure of FIG. 2.

FIG. 8 is a conceptual diagram describing example normal communication that is performed in the connection structure of FIG. 2.

The main processor 2100 may perform the enumeration/configuration operation while performing the booting operation based on the boot-up instruction BUI received from the storage device 2400*a*. According to the enumeration/configuration operation, the main processor 2100 may recognize endpoint devices, and may set suitable communication conditions. For example, the main processor 2100 may transmit the enumeration/configuration command to the storage device 2400*a* (operation ⑥) to perform the enumeration/configuration operation on the storage device 2400*a*.

The controller 2430*a* may perform the configuration operation based on the enumeration/configuration command. In the configuration operation, the controller 2430*a* may newly store the setting information STI in the configuration memory 2450*a* (operation ⑦). The newly stored setting information STI may be associated with a condition in which the normal communication with the main processor 2100 is performed. Accordingly, the controller 2430*a* may perform the normal communication with the main processor 2100 under the condition defined by the newly stored setting information STI (operation ⑧). For example, the normal communication may include general communication such as exchanging command and response, data transmitting and receiving, and/or the like.

According to the above processes, the controller 2430a may newly store the setting information STI in the configuration memory 2450a, after releasing the setting information STI having the self-setting value SSV and resetting the configuration memory 2450a. The newly stored setting information STI may include the same value(s) as the self-setting value SSV, or may include value(s) which is/are different from the self-setting value SSV.

Figure 9:
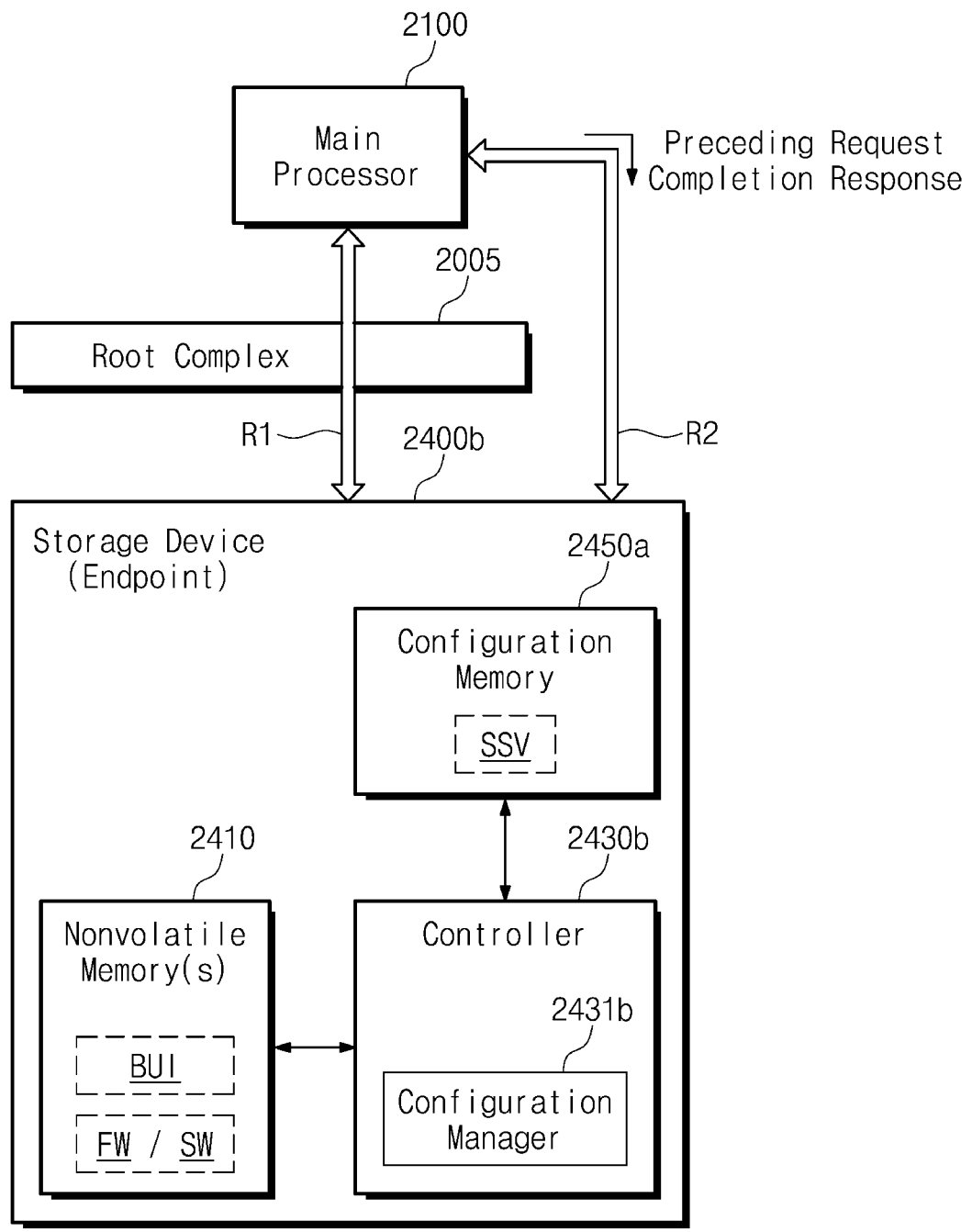
FIG. 9 is a conceptual diagram for describing example sideband communication between electronic devices of the connection structure of FIG. 2.

FIG. 9 is a conceptual diagram for describing example sideband communication between electronic devices of the connection structure of FIG. 2.

The storage device 2400b may include the nonvolatile memory(s) 2410, a controller 2430b, and the configuration memory 2450a. The storage device 2400b may be connected with the main processor 2100 through the root complex 2005 to communicate with the main processor 2100.

The root complex 2005, the main processor 2100, the nonvolatile memory(s) 2410, and the configuration memory 2450a have been described with reference to FIGS. 2 to 8. Configurations and operations of the storage device 2400b, the controller 2430b, and the configuration manager 2431b may respectively include configurations and operations of the storage device 2400a, the controller 2430a, and the configuration manager 2431a described with reference to FIGS. 2 to 8. For brevity, redundant descriptions will be omitted below.

The main processor 2100 and the storage device 2400b may perform first communication R1 in compliance with the main interface protocol. For example, as assumed above, the main interface protocol may be associated with the PCIe communication protocol. However, the example embodiments are not limited thereto. For example, the main interface protocol may be associated with at least one of other communication protocols such as NVMe, SCSI, ATA, SATA, PATA, SAS, UFS, and/or the like.

For example, the first communication R1 between the main processor 2100 and the storage device 2400b may include the normal communication (refer to operation S160 of FIG. 3). For example, according to the first communication R1, the main processor 2100 may provide the memory read request to the storage device 2400b (refer to operation S123 of FIG. 3), and may provide the enumeration/communication command to the storage device 2400b (refer to operation S150 of FIG. 3). For example, according to the first communication R1, the storage device 2400b may provide the data of the boot-up instruction BUI to the main processor 2100 (refer to operation S126 of FIG. 3).

In some example embodiments, the main processor 2100 and the storage device 2400b may perform second communication R2 in compliance with the sideband interface protocol. The sideband interface protocol may be employed to exchange secondary information, independently of the main interface protocol. For example, the sideband interface protocol may be associated with at least one of inter-integrated circuit (I2C), a system management bus (SMBus), and/or the like. However, the example embodiments are not limited thereto.

For example, before the main processor 2100 provides the memory read request to the storage device 2400b according to the first communication R1, the main processor 2100 may provide a preceding request to the storage device 2400b according to the second communication R2. On the basis of the preceding request, the controller 2430b may recognize that the main processor 2100 will transmit the memory read request soon. Accordingly, the controller 2430b may execute the configuration manager 2431b in response to the preceding request. The configuration manager 2431a may store the setting information STI having the self-setting value SSV in the configuration memory 2450a, in response to the preceding request.

For example, the main processor 2100 may transmit the completion response to the storage device 2400a according to the second communication R2, to inform that the boot-up instruction BUI is completely received. The configuration manager 2431a may determine that the data of the boot-up instruction BUI is completely provided to the main processor 2100, in response to the completion response.

Figure 10:
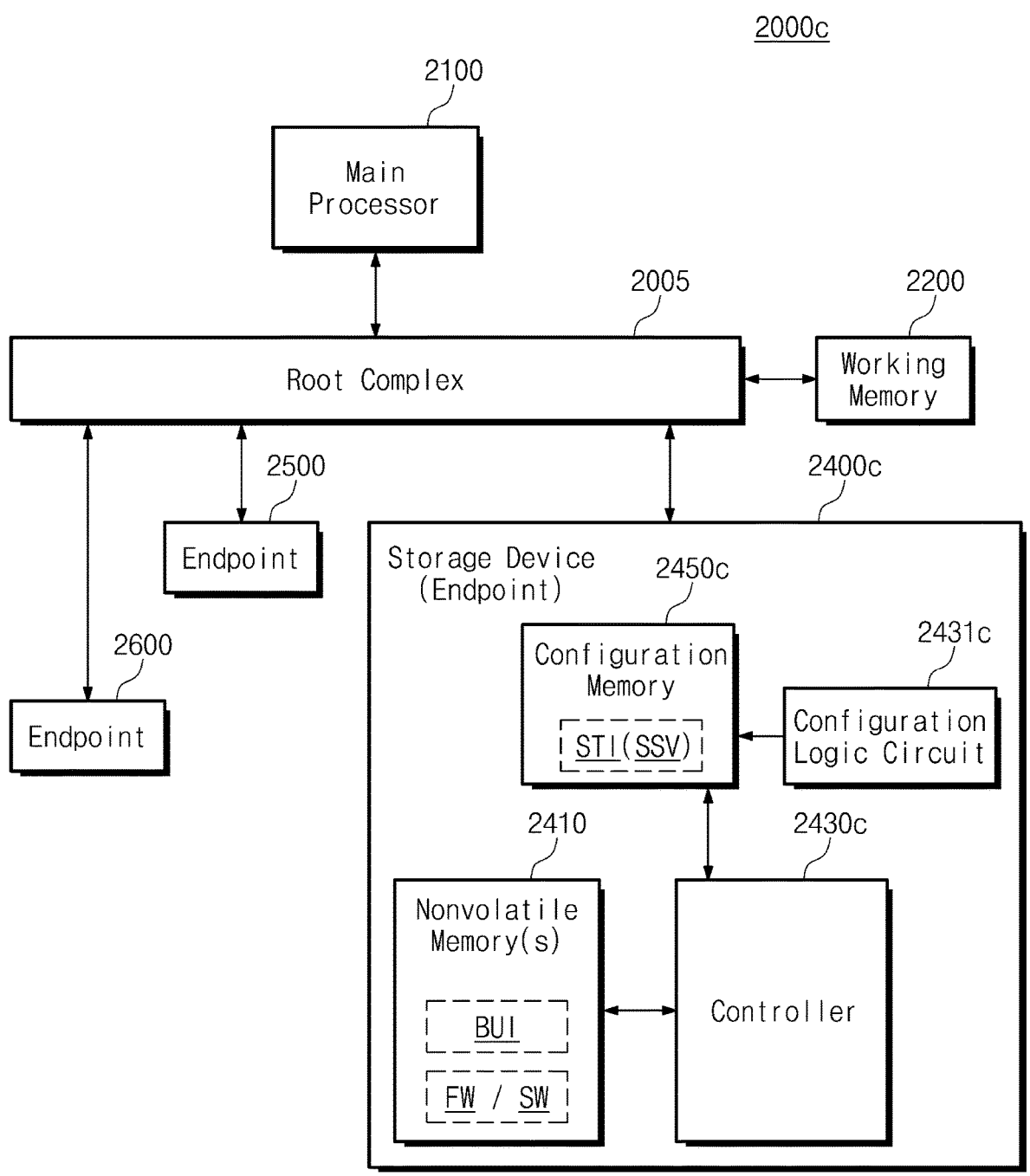
FIG. 10 is a block diagram illustrating an example connection structure between electronic devices of FIG. 1.

FIG. 10 is a block diagram illustrating an example connection structure between electronic devices of FIG. 1. For example, the computing device 1000 of FIG. 1 may employ a PCI/PCIe fabric 2000c to connect electronic devices (e.g., the main processor 1100, the working memory 1200, the storage device 1400, the communications block 1500, and the graphic processor device 1600).

For example, the PCI/PCIe fabric 2000c may include the root complex 2005, the main processor 2100, the working memory 2200, and endpoint devices 2400c, 2500, and 2600. For example, the endpoint device 2400c may be implemented in a storage device (hereinafter referred to as the "storage device 2400c"), and may include the nonvolatile memory(s) 2410, a controller 2430c, a configuration logic circuit 2431c, and a configuration memory 2450c.

The root complex 2005, the main processor 2100, the working memory 2200, the nonvolatile memory 2410, and the endpoint devices 2500 and 2600 have been described with reference to FIGS. 2 to 9. Configurations and operations of the controller 2430c and the configuration memory 2450c may include configurations and operations of the controller 2430a or 2430b and the configuration memory 2450a described with reference to FIGS. 2 to 9, except the controller 2430c does not include the configuration manager 2431a of FIG. 2 or the configuration manager 2431b of FIG. 9. For brevity, redundant descriptions will be omitted below.

The configuration logic circuit 2431c may be configured to perform the self-configuration operation described with reference to FIGS. 2 to 9. Before the configuration memory 2450c stores the setting information STI based on the enumeration/configuration command from an external device (e.g., the main processor 2100), the configuration logic circuit 2431c may store the setting information STI having the self-setting value SSV in the configuration memory 2450c according to the self-configuration operation.

Under a condition defined by the self-setting value SSV, the controller 2430c may read the boot-up instruction BUI from the nonvolatile memory 2410 in response to the memory read request from the main processor 2410. The controller 2430c may provide the data of the read boot-up instruction BUI to the main processor 2100. Accordingly, on the basis of the self-setting value SSV stored in the self-configuration operation, the main processor 2100 may communicate with the storage device 2400c before executing the boot-up instruction BUI.

The configuration logic circuit 2431c may be implemented in a hardware circuit including one or more analog and/or digital circuits to perform the self-configuration operation. An example configuration and operation of the configuration logic circuit 2431c will be described with reference to FIG. 11.

Figure 11:
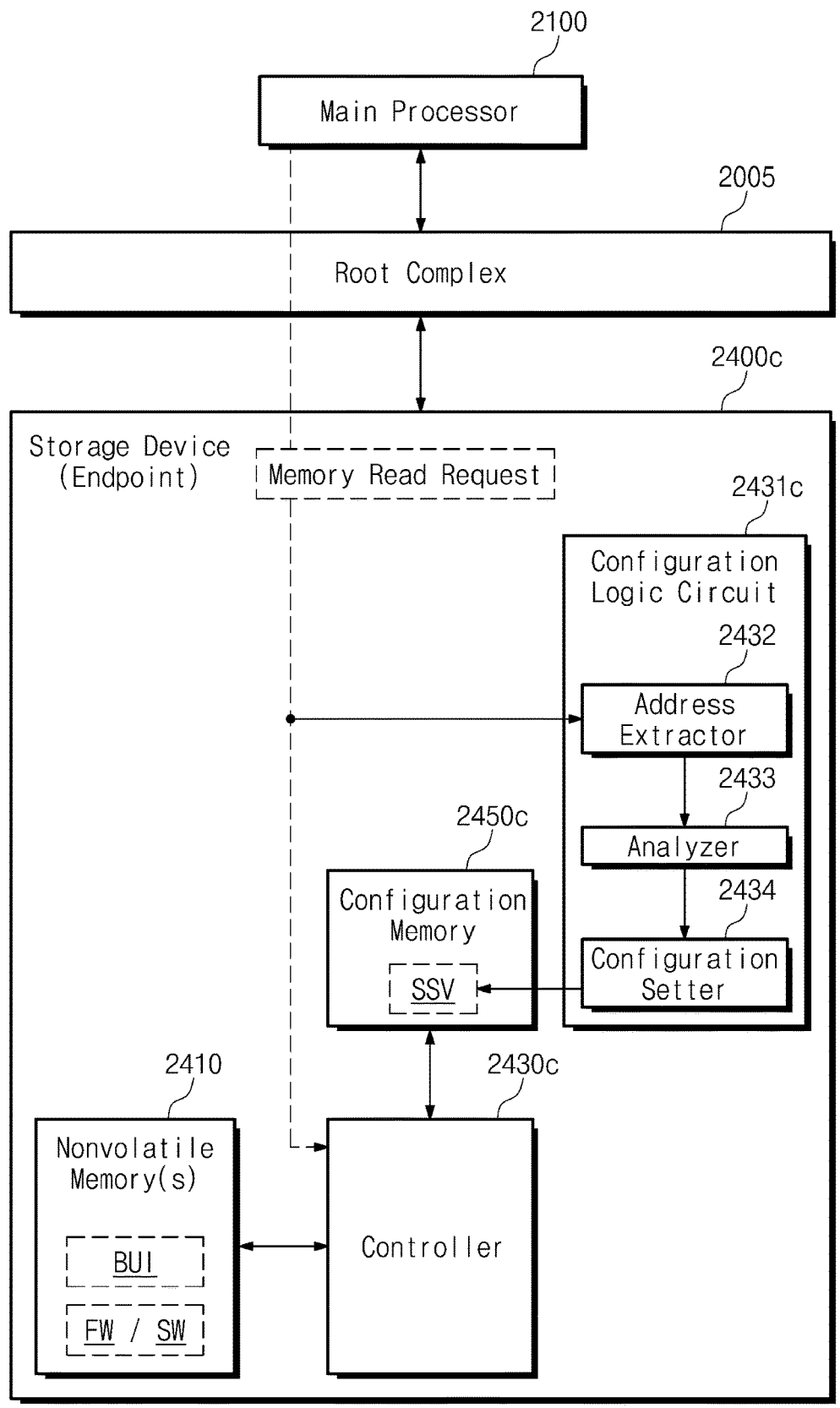
FIG. 11 is a conceptual diagram illustrating an example configuration and operation of a configuration logic circuit based on the connection structure of FIG. 10.

FIG. 11 is a conceptual diagram illustrating an example configuration and operation of a configuration logic circuit based on a connection structure of FIG. 10. In some example embodiments, the configuration logic circuit 2431c may include an address extractor 2432, an analyzer 2433, and a configuration setter 2434.

The address extractor 2432 may be connected to a transmission path of the memory read request received from the main processor 2100. The address extractor 2432 may monitor whether the memory read request is received from the main processor 2100. When the memory read request is received, the address extractor 2432 may extract a signal address corresponding to the received memory read request, from the received memory read request. For example, the address extractor 2432 may snoop on a field which describes the signal address in a data format of the received memory read request.

The analyzer 2433 may analyze the signal address extracted by the address extractor 2432. The analyzer 2433 may define a signal address range including the extracted signal address. For example, the analyzer 2433 may select an upper limit value and/or a lower limit value of the signal address range to define the signal address range.

The configuration setter 2434 may store the setting information STI having the self-setting value SSV in the configuration memory 2450c, based on the signal address range defined by the analyzer 2433. For example, the configuration setter 2434 may store the upper limit value and/or the lower limit value of the signal address range in the configuration memory 2450c as the self-setting value SSV.

Accordingly, the self-setting value SSV stored in the configuration memory 2450c may define a condition for receiving the memory read request from the main processor 2100 and processing the received memory read request. On the basis of the self-setting value SSV (e.g., the upper limit value and/or the lower limit value), the controller 2430c may receive the memory read request that has the signal address extracted by the address extractor 2432, from the main processor 2100.

For example, when the memory read request has a signal address of "0xA000", the analyzer 2433 may select a signal address range that is defined by a lower limit value of "0x0000" and an upper limit value of "0xF000". In addition, the configuration setter 2434 may store the lower limit value of "0x0000" and the upper limit value "0xF000" (or only the upper limit value of "0xF000") in the configuration memory 2450c as the self-setting value SSV. Accordingly, the controller 2430c may receive the memory read request having the signal address of "0xA000" that is included in the signal address range between the lower limit value of "0x0000" and the upper limit value "0xF000".

However, the above example embodiment is provided to facilitate better understanding, and the example embodiments are not limited thereto. A configuration and an operation of the configuration logic circuit 2431c may be variously changed or modified.

In some other example embodiments, the configuration logic circuit 2431c may be configured to store the self-setting value SSV which allows all inputs to be received, in the configuration memory 2450c. For example, the configuration logic circuit 2431c may store a maximum value among signal addresses of all signals output from the main processor 2100, in the configuration memory 2450c as the upper limit value. In addition, the configuration logic circuit 2431c may store a minimum value among the signal addresses of all signals output from the main processor 2100, in the configuration memory 2450c as the lower limit value.

According to the above example, the controller 2430c may receive any input which has a signal address between the maximum value and the minimum value. Accordingly, the controller 2430c may receive the memory read request from the main processor 2100 regardless of a signal address of the memory read request. To this end, the configuration logic circuit 2431c may be configured to know (e.g., receive or store) information associated with a maximum value and a minimum value among signal addresses of signals output from the main processor 2100 in advance (e.g., in advance before the storage device 2400c operates).

Figure 12:
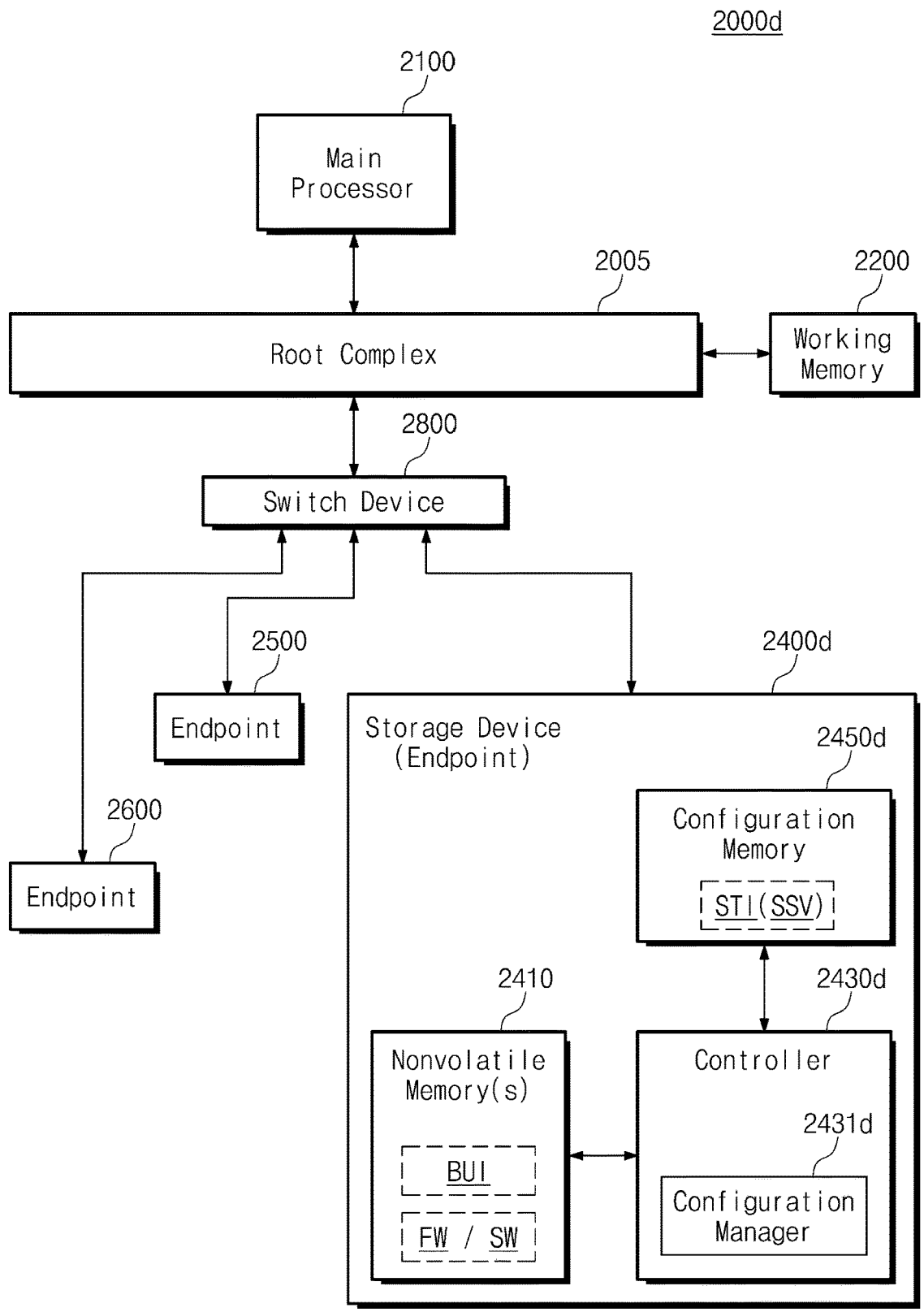
FIG. 12 is a block diagram illustrating an example connection structure between electronic devices of FIG. 1.

FIG. 12 is a block diagram illustrating an example connection structure between electronic devices of FIG. 1. For example, the computing device 1000 of FIG. 1 may employ a PCI/PCIe fabric 2000d to connect electronic devices (e.g., the main processor 1100, the working memory 1200, the storage device 1400, the communications block 1500, and the graphic processor device 1600).

For example, the PCI/PCIe fabric 2000d may include the root complex 2005, the main processor 2100, the working memory 2200, endpoint devices 2400d, 2500, and 2600, and a switch device 2800. For example, the endpoint device 2400d may be implemented in a storage device (hereinafter referred to as the "storage device 2400d"), and may include the nonvolatile memory(s) 2410, a controller 2430d, and a configuration memory 2450d. The controller 2430d may include (e.g., execute) a configuration manager 2431d.

The root complex 2005, the main processor 2100, the working memory 2200, the nonvolatile memory 2410, and the endpoint devices 2500 and 2600 have been described with reference to FIGS. 2 to 9. Configurations and operations of the storage device 2400d, the controller 2430d, the configuration manager 2431d, and the configuration memory 2450d may respectively include configurations and operations of the storage device 2400a or 2400b, the controller 2430a or 2430b, the configuration manager 2431a or 2431b, and the configuration manager 2450a described with reference to FIGS. 2 to 9. For brevity, redundant descriptions will be omitted below.

A switch device 2800 may be connected between the root complex 2005 and the endpoint devices 2400d, 2500, and 2600. The endpoint devices 2400d, 2500, and 2600 may communicate with the main processor 2100 through the switch device 2800 and the root complex 2005. The switch device 2800 may provide transmission paths of commands, requests, queries, data, signals, packets, and/or the like, between the endpoint devices 2400d, 2500, and 2600 and the main processor 2100 according to an operation policy of the PCI/PCIe fabric 2000d. For example, the switch device 2800 may correspond to a PCI/PCIe switch. An example configuration and operation of the switch device 2800 will be described with reference to FIG. 13.

Figure 13:
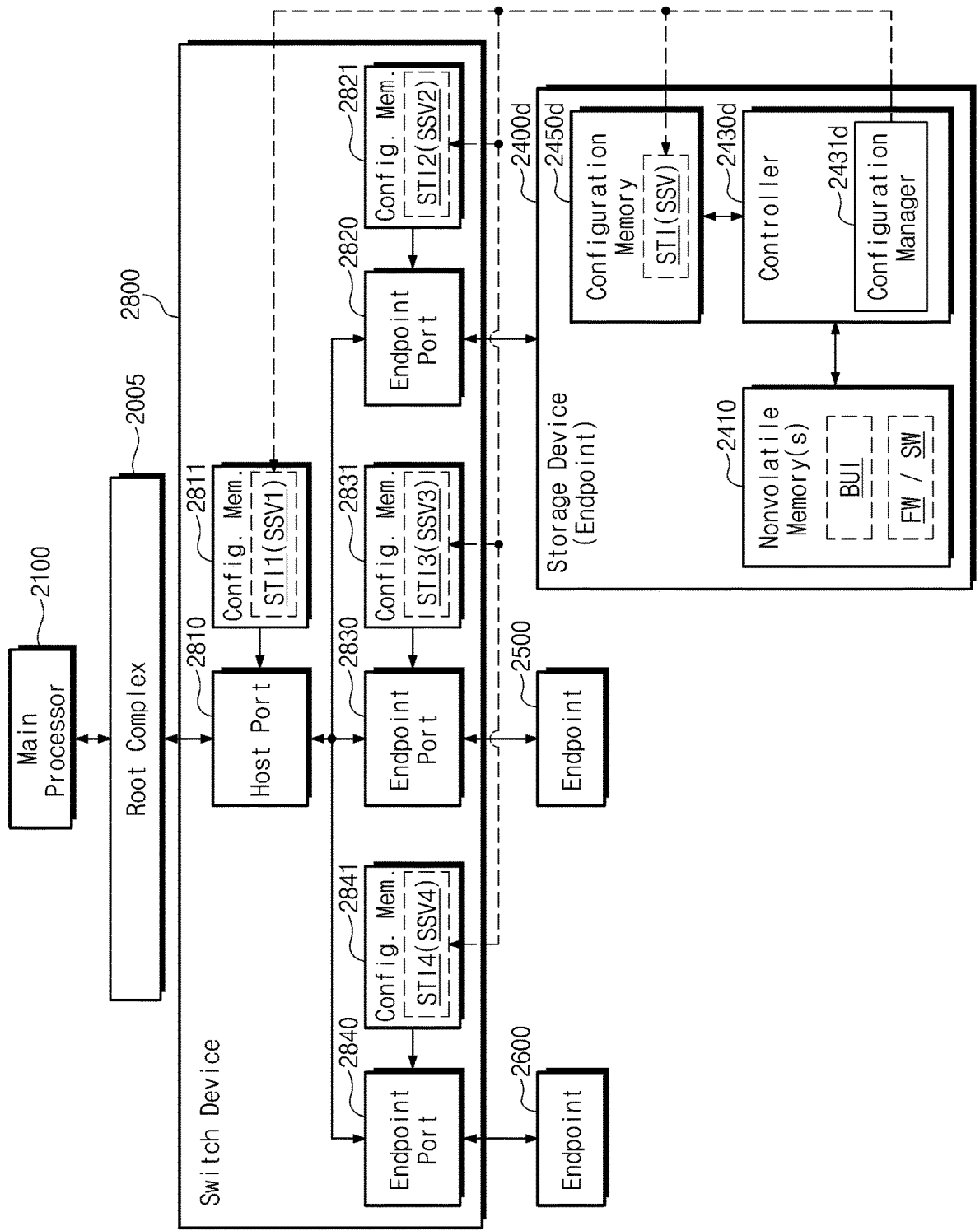
FIG. 13 is a conceptual diagram describing an example self-configuration operation that is performed in the connection structure of FIG. 12.

FIG. 13 is a conceptual diagram describing an example self-configuration operation that is performed in a connection structure of FIG. 12.

The switch device 2800 may include a host port 2810 and a plurality of endpoint ports 2820, 2830, and 2840. The host port 2810 may be connected to a host (e.g., the main processor 2100). The endpoint ports 2820, 2830, and 2840 may be connected with the endpoint devices 2400d, 2500, and 2600, respectively. FIG. 13 shows three endpoint ports 2820, 2830, and 2840, but the number of endpoint ports may be variously changed or modified.

The switch device 2800 may include switch configuration memories 2811, 2821, 2831, and 2841. The switch configuration memory 2811 may store the setting information STI1 associated with a condition in which communication with the host is performed through the host port 2810. The host port 2810 may provide a transmission path of commands, requests, queries, data, signals, packets, and/or the like, under a condition defined by the setting information STI1. For example, the host port 2810 may provide a transmission path of an enumeration/configuration command that has a signal address included in a signal address range of the setting information STI1.

The switch configuration memories 2821, 2831, and 2841 may respectively store setting information STI2, STI3, and STI4 associated with conditions in which communication with the host is performed through the endpoint ports 2820, 2830, and 2840. The endpoint ports 2820, 2830, and 2840 may provide transmission paths of commands, requests, queries, data, signals, packets, and/or the like, under conditions defined by the setting information STI2, STI3, and STI4.

The endpoint device 2400d, which stores the boot-up instruction BUI, from among the endpoint devices 2400d, 2500, and 2600 may be referred to as a "target endpoint device". In addition, the endpoint port 2820 connected to the target endpoint device 2400d may be referred to as a "target endpoint port".

The configuration manager 2431d may perform the self-configuration operation described with reference to FIGS. 2 to 9. The configuration memory 2450d may store the setting information STI associated with a condition in which communication with the host is performed through the switch device 2800. Before the configuration memory 2450d stores the setting information STI based on the enumeration/configuration command from a host, the configuration manager 2431d may store the setting information STI having the self-setting value SSV in the configuration memory 2450d according to the self-configuration operation.

In addition, the self-configuration operation of the configuration manager 2431d may be also performed for the switch device 2800. For example, before the switch configuration memories 2811, 2821, 2831, and 2841 store setting information STI1, STI2, STI3, and STI4 based on the enumeration/configuration command from the main processor 2100, the switch device 2800 may store the setting information STI1 having a self-setting value SSV1 in the switch configuration memory 2811 corresponding to the host port 2810 and may store the setting information STI2 having a self-setting value SSV2 in the switch configuration memory 2821 corresponding to the target endpoint port 2820, under control of the target endpoint device 2400d (i.e., according to the self-configuration operation of the configuration manager 2431d).

The host port 2810 and the target endpoint port 2820 may provide a transmission path under conditions defined by the self-setting values SSV1 and SSV2. For example, the switch device 2800 may transfer the memory read request received from the main processor 2100, to the target endpoint device 2400d through the host port 2810 and the target endpoint port 2820. In addition, the switch device 2800 may transfer the data of the boot-up instruction BUI output from the target endpoint device 2400d in response to the memory read request, to the main processor 2100 through the target endpoint port 2820 and the host port 2810. Accordingly, even though the enumeration/configuration operation is not performed yet, the target endpoint device 2400d may provide the data of the boot-up instruction BUI to the main processor 2100 through the switch device 2800.

In some example embodiments, during the self-configuration operation, the switch device 2800 may store the setting information STI1 and STI2 having the self-setting values SSV1 and SSV2 only in the switch configuration memories 2811 and 2821. On the other hand, during the self-configuration operation, the switch configuration memories 2831 and 2841 may not store the setting information STI3 and STI4 having self-setting values SSV3 and SSV4. In such the example embodiments, the switch device 2800 may transfer the memory read request from the main processor 2100 only to the target endpoint device 2400d, and may not transfer the memory read request to other remaining endpoint devices 2500 and 2600.

In some example embodiments, during the self-configuration operation, the switch device 2800 may store the setting information STI3 and STI4 having the self-setting values SSV3 and SSV4 in the switch configuration memories 2831 and 2841. In such the example embodiments, the switch device 2800 may transfer the memory read request from the main processor 2100 to the target endpoint device 2400d and the remaining endpoint devices 2500 and 2600. However, since the endpoint devices 2500 and 2600 do not store the boot-up instruction BUI, the endpoint devices 2500 and 2600 may ignore the memory read request or may output an error response. Alternatively, the switch device 2800 may ignore or may not receive a response, which corresponds to the memory read request, from the endpoint devices 2500 and 2600. Accordingly, the switch device 2800 may receive a response corresponding to the memory read request only from the target endpoint device 2400d.

In FIGS. 12 and 13, the controller 2430d of the target endpoint device 2400d has been described as including (e.g., executing) the configuration manager 2431d. However, the entirety or a part of the configuration manager 2431d may be implemented outside the target endpoint device 2400d. For example, the entirety or a part of the configuration manager 2431d may be included in the switch device 2800. Implementation of the configuration manager 2431d may be variously changed or modified to perform the self-configuration operation. In some example embodiments, the entirety or a part of the configuration manager 2431d may be implemented in a hardware circuit to be the same as or similar to the configuration logic circuit 2431c described with reference to FIGS. 10 and 11.

Figure 14:
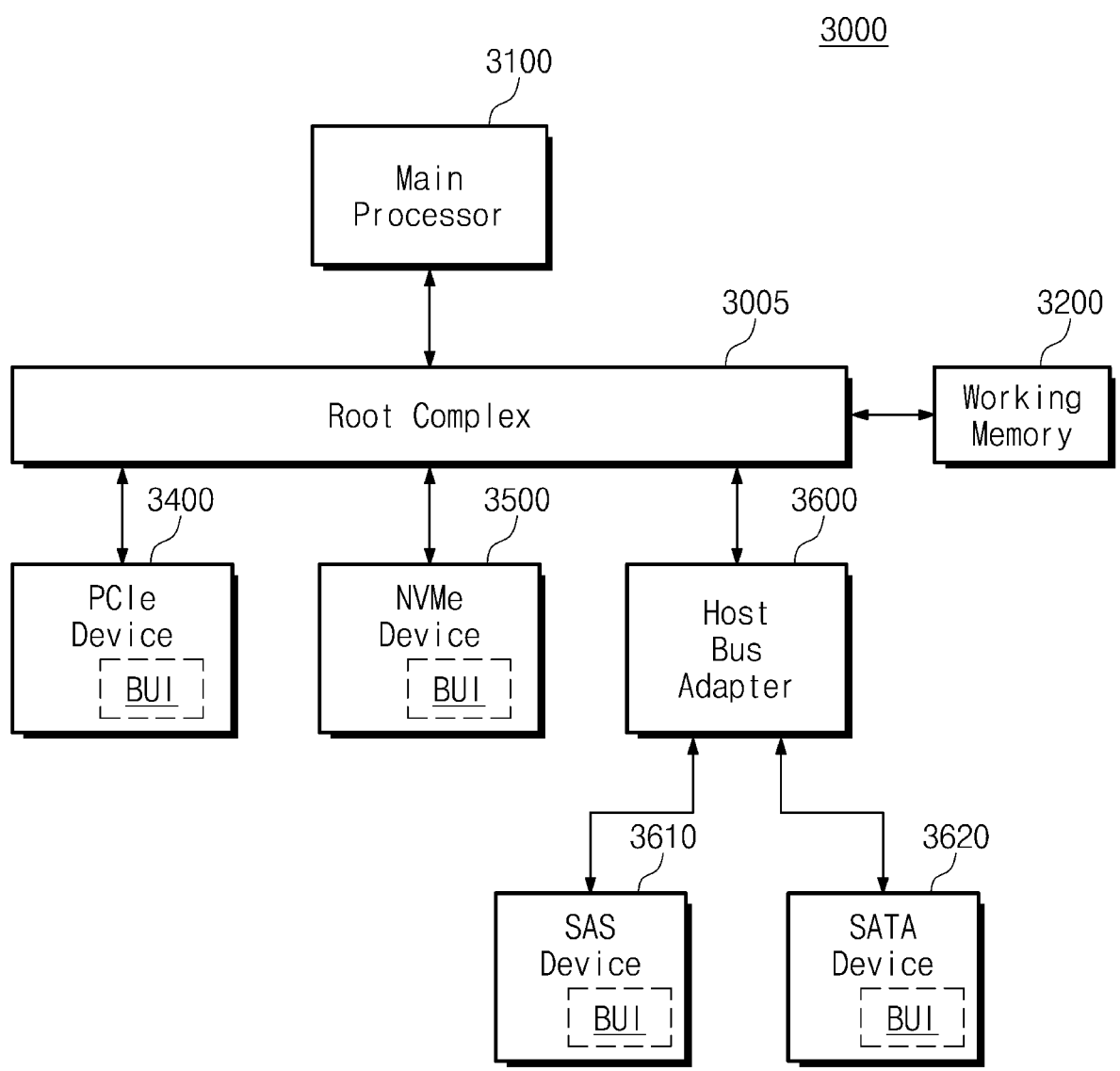
FIG. 14 is a block diagram illustrating an example connection structure between electronic devices of FIG. 1.

FIG. 14 is a block diagram illustrating an example connection structure between electronic devices of FIG. 1. For example, the computing device 1000 of FIG. 1 may employ a connection structure 3000 to connect electronic devices (e.g., the main processor 1100, the working memory 1200, the storage device 1400, the communications block 1500, and the graphic processor device 1600).

The connection structure 3000 may include a root complex 3005, a main processor 3100, a working memory 3200, a PCIe device 3400, an NVMe device 3500, a host bus adapter (HBA) 3600, a SAS device 3610, and a SATA device 3620. Configurations and operations of the root complex 3005, the main processor 3100, and the working memory 3200 may include configurations and operations of the root complex 2005, the main processor 2100, and the working memory 2200 of FIGS. 2 to 13, respectively. For brevity, redundant descriptions will be omitted below.

As described with reference to FIGS. 2 to 13, the PCIe device 3400 employing the PCIe communication protocol may communicate with the main processor 3100 through the root complex 3005. In addition, the NVMe device 3500 employing the NVMe communication protocol may also communicate with the main processor 3100 through the root complex 3005. In some cases, the SAS device 3610 employing the SAS communication protocol and the SATA device 3620 employing the SATA communication protocol may be connected with the root complex 3005 through the HBA 3600. For example, the HBA 3600 may process an interface translation for the SAS device 3610 and the SATA device 3620.

As well as the PCIe device 3400, each of the NVMe device 3500, the SAS device 3610, and the SATA device 3620 may store the boot-up instruction BUI. Each of the PCIe device 3400, the NVMe device 3500, the SAS device 3610, and the SATA device 3620 may perform the self-configuration operation to provide the boot-up instruction BUI to the main processor 3100 before the enumeration/configuration operation is performed. That is, the example embodiments described with reference to FIGS. 2 to 13 may be applied to various other communication protocols as well as the PCIe communication protocol.

In FIGS. 2 to 13, the storage device 2400a, 2400b, 2400c, or 2400d has been described as storing the boot-up instruction BUI. However, the boot-up instruction BUI may be stored in another type of endpoint device other than the storage device. The boot-up instruction BUI may be stored in any type of endpoint device that includes a memory. For example, the boot-up instruction BUI may be stored in a graphic processor device, a communication device, and/or the like.

Figure 15:
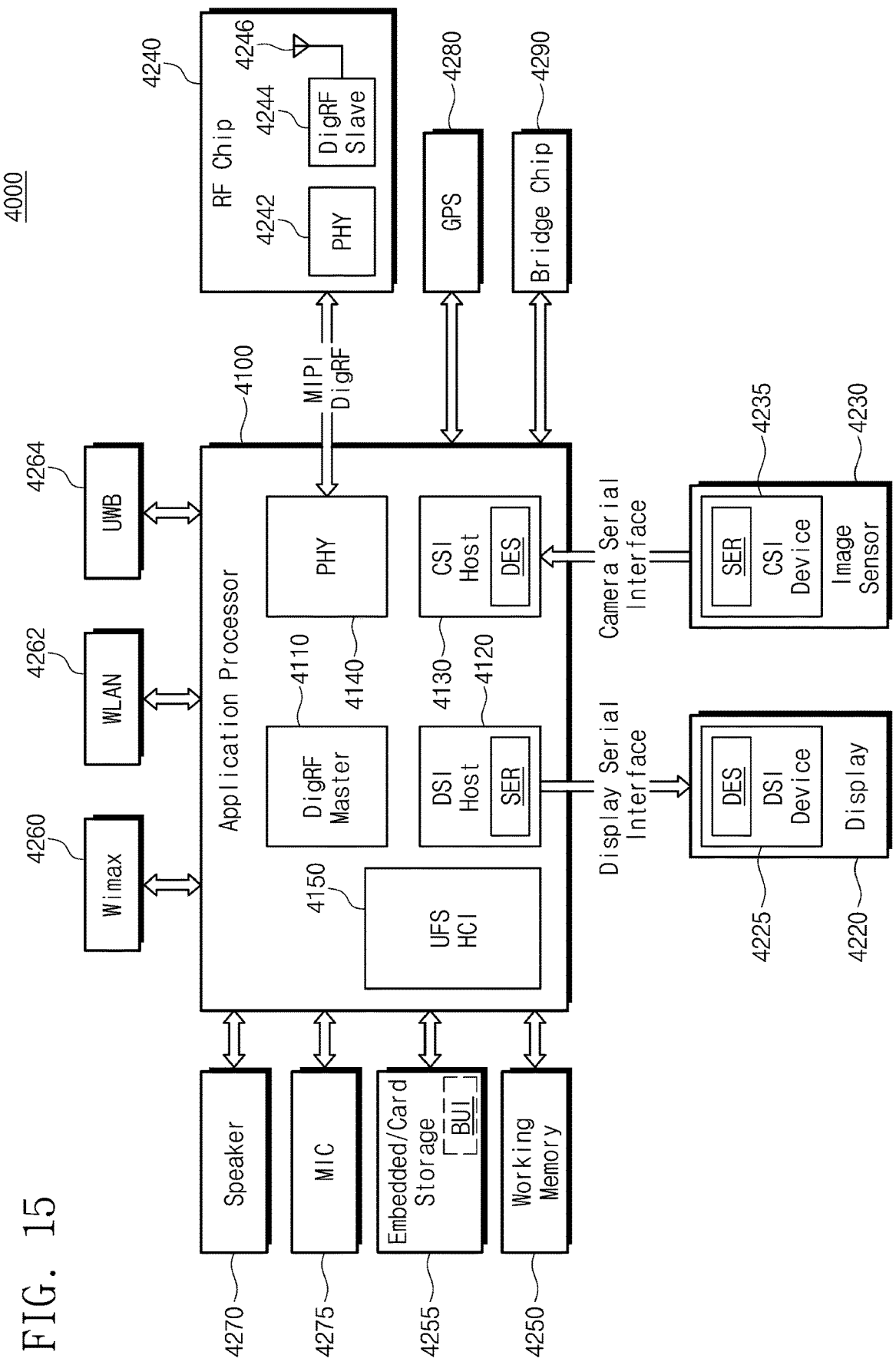
FIG. 15 is a block diagram illustrating an example configuration of an electronic device and interfaces thereof, according to example embodiments.

FIG. 15 is a block diagram illustrating an example configuration of an electronic device and interfaces thereof, according to the example embodiments. An electronic device 4000 may be implemented in a data processing device capable of using or supporting an interface protocol proposed by mobile industry processor interface (MIPI) alliance. For example, the electronic device 4000 may be one of various electronic devices such as a portable communication terminal, a personal digital assistant (PDA), a portable multimedia player (PMP), a smart phone, a tablet computer, a wearable device, and/or the like.

The electronic device 4000 may include an application processor 4100, a display 4220, and an image sensor 4230. The application processor 4100 may include a DigRF master 4110, a display serial interface (DSI) host 4120, a camera serial interface (CSI) host 4130, a physical layer 4140, and an UFS host-controller interface (HCI) 4150.

The DSI host 4120 may communicate with a DSI device 4225 of the display 4220 in compliance with the DSI. For example, an optical serializer SER may be implemented in the DSI host 4120, and an optical deserializer DES may be implemented in the DSI device 4225.

The CSI host 4130 may communicate with a CSI device 4235 of the image sensor 4230 in compliance with the CSI. For example, an optical deserializer DES may be implemented in the CSI host 4130, and an optical serializer SER may be implemented in the CSI device 4235.

The electronic device 4000 may further include a radio frequency (RF) chip 4240 that communicates with the application processor 4100. The RF chip 4240 may include a physical layer 4242, a DigRF slave 4244, and an antenna 4246. For example, the physical layer 4242 of the RF chip 4240 and the physical layer 4140 of the application processor 4100 may exchange data with each other in compliance with DigRF interface proposed by the MIPI alliance.

The electronic device 4000 may further include a working memory 4250 and an embedded/card storage device 4255. The working memory 4250 may temporarily store data processed or to be processed by the application processor 4100. The working memory 4250 may include a volatile memory such as a static random access memory (SRAM), a dynamic RAM (DRAM), a synchronous DRAM (SDRAM), and/or the like, and/or a nonvolatile memory such as a flash memory, a PRAM, an MRAM, and ReRAM, a FRAM, and/or the like.

The embedded/card storage device 4255 may store data provided from the application processor 4100, or may provide the stored data to the application processor 4100. The embedded/card storage device 4255 may store data regardless of power supply. For example, the embedded/card storage device 4255 may store the boot-up instruction BUI to be used in the booting operation of the application processor 4100.

For example, the embedded/card storage device 4255 may communicate with the application processor 4100 in compliance with the UFS communication protocol. In this example, the application processor 4100 may process communication with the embedded/card storage device 4255 through the UFS HCI 4150. For example, the UFS HCI 4150 may recognize the embedded/card storage device 4255 according to a link startup process defined in the UFS communication protocol.

Before the link startup process is completed, the UFS HCI 4150 may not communicate with the embedded/card storage device 4255. Accordingly, in the example embodiments, the embedded/card storage device 4255 may perform the self-configuration operation to provide data of the boot-up instruction BUI to the application processor 4100 before the link startup process starts. The self-configuration operation may be performed to be similar to that described with reference to FIGS. 2 to 13. For brevity, redundant descriptions will be omitted below.

The electronic device 4000 may communicate with an external device/system through a communication module, such as a worldwide interoperability for microwave access (WiMAX) 4260, a wireless local area network (WLAN) 4262, an ultra-wideband (UWB) 4264, and/or the like. Besides, the electronic device 4000 may communicate with the external device/system based on at least one of various wireless communication protocols, such as LTE, GSM, CDMA, Bluetooth, NFC, Wi-Fi, RFID, and/or the like, and/or various wired communication protocols, such as TCP/IP, USB, SCSI, mobile PCIe (M-PCIe), Firewire, and/or the like.

The electronic device 4000 may further include a speaker 4270 and a microphone 4275, which are used to process voice information. In addition, the electronic device 4000 may further include a global positioning system (GPS) device 4280 for processing position information. The electronic device 4000 may further include a bridge chip 4290 for managing connection with peripheral devices.

According to the example embodiments described above, a processor may read a boot-up instruction from a high-speed endpoint device instead of a low-speed memory. Accordingly, a booting operation may be quickly performed.

According to the example embodiments described above, an additional memory, a device for managing the additional memory, and a battery provided to retain data of the additional memory may be removed from an electronic device. Accordingly, it may be possible to reduce the whole area of a system/device and to save costs for implementation.

According to the example embodiments described above, when there is a need to update the boot-up instruction, it may be sufficient to newly install a program code (e.g., firmware) stored in an endpoint device, instead of replacing an additional memory. Accordingly, the boot-up instruction may be easily updated with low costs.

Although detailed example embodiments have been described, it should be understood that numerous other modifications, changes, variations, and substitutions can be devised by those skilled in the art. Moreover, it should be understood that the present disclosure covers various techniques which can be readily modified and embodied based on the above-described example embodiments.

What is claimed is:

1. An electronic device comprising:
a first memory configured to store data of a boot-up instruction;
a second memory configured to store setting information associated with a condition in which communication with an external device is performed; and
a controller comprising a hardware circuit, or one or more processor cores executing program code to:
store the setting information having a self-setting value in the second memory, before the second memory stores the setting information based on a command from the external device, and
provide the data of the boot-up instruction to the external device in response to a memory read request, the memory read request being received from the external device under a condition defined by the self-setting value.

2. The electronic device of claim 1, wherein:
the boot-up instruction is associated with at least one of a basic input/output system (BIOS), an extensible firmware interface (EFI), or a unified EFI (UEFI).

3. The electronic device of claim 1, wherein:
the second memory is associated with a configuration space which is defined in a peripheral component interconnect (PCI) or PCI express (PCIe) communication protocol.

4. The electronic device of claim 1, wherein:
the controller is further configured to release the setting information having the self-setting value and to reset the second memory, in response to the data of the boot-up instruction being completely provided to the external device.

5. The electronic device of claim 4, wherein:
the controller is further configured to determine that the data of the boot-up instruction is completely provided to the external device, in response to a whole portion of the data of the boot-up instruction being output to the external device.

6. The electronic device of claim 4, wherein:
the controller is further configured to determine that the data of the boot-up instruction is completely provided to the external device, in response to receipt of a completion response from the external device, or receipt of the command from the external device.

7. The electronic device of claim 4, wherein:
the controller is further configured to newly store the setting information in the second memory based on the command from the external device, after releasing the setting information having the self-setting value and resetting the second memory.

8. An electronic device comprising:
a first memory configured to store data of a boot-up instruction;
a second memory configured to store setting information associated with a condition in which communication with an external device is performed; and
a logic circuit configured to store the setting information having a self-setting value in the second memory, before the second memory stores the setting information based on a command from the external device; and a controller comprising a hardware circuit or one or more processor cores executing program code to provide the data of the boot-up instruction to the external device in response to a memory read request under a condition defined by the self-setting value, the memory read request being received from the external device.

9. The electronic device of claim 8, wherein:
the setting information comprises at least information of a signal address range, and
the self-setting value comprises an upper limit value and a lower limit value which define the signal address range.

10. The electronic device of claim 9, wherein:
the logic circuit is further configured to:
store a maximum value among signal addresses of signals output from the external device, in the second memory as the upper limit value, and
store a minimum value among the signal addresses of signals output from the external device, in the second memory as the lower limit value.

11. The electronic device of claim 10, wherein:
the controller is further configured to receive and act on the memory read request having a signal address between the maximum value and the minimum value, from the external device.

12. The electronic device of claim 9, wherein:
the logic circuit is further configured to:
extract a signal address corresponding to the received memory read request, and
store the upper limit value or the lower limit value, or store both the upper limit value and the lower limit value, in the second memory based on the extracted signal address.

13. The electronic device of claim 12, wherein:
the controller is further configured to receive the memory read request having the extracted signal address, from the external device, based on the stored upper limit value or the stored lower limit value, or based on both the stored upper limit value and the stored lower limit value.

14. The electronic device of claim 8, wherein:
a memory area, of the second memory, in which the setting information having the self-setting value is stored is a first area which is referred to by the external device for communication between the external device and the controller, a second area other than the first area, or an expansion read-only memory (ROM) area.

15. An electronic device comprising:
a switch device comprising:
a host port configured to be connected to a host,
a plurality of endpoint ports configured to be respectively connected to a plurality of endpoint devices, and
first memories each configured to store setting information, the setting information of one of the first memories being associated with a condition in which communication with the host is performed through the host port and the setting information of other ones of the first memories being associated with a condition in which communication with the endpoint devices is performed through the respective endpoint ports, respectively; and
a target endpoint device configured to be connected to a target endpoint port among the plurality of endpoint ports, and configured to store data of a boot-up instruction,
wherein the switch device is configured to:

store, before the first memories store the setting information based on a command from the host, the setting information having a self-setting value in target memories, which correspond to the host port and the target endpoint port from among the first memories, under control of the target endpoint device, transfer a memory read request received from the host, to the target endpoint device under a condition defined by the self-setting value, and transfer the data of the boot-up instruction output from the target endpoint device in response to the memory read request, to the host.

16. The electronic device of claim 15, wherein:
the target endpoint device comprises a second memory which is configured to store configuration information, the configuration information being associated with a condition in which communication with the host is performed through the switch device.

17. The electronic device of claim 16, wherein:
the target endpoint device is further configured to store the configuration information having an internal self-setting value in the second memory, before the second memory stores the configuration information based on the command from the host.

18. The electronic device of claim 15, wherein:
the switch device is configured to:
store the setting information having the self-setting value only in the target memories,
transfer the memory read request to the target endpoint device, and
prohibit the memory read request from being transferred to remaining endpoint devices other than the target endpoint device.

19. The electronic device of claim 15, wherein:
the switch device is configured to:
store the setting information having the self-setting value in the target memories and other first memories, and
transfer the memory read request to all the plurality of endpoint devices including the target endpoint device.

20. The electronic device of claim 19, wherein:
the switch device ignores or does not receive a response corresponding to the memory read request from remaining endpoint devices other than the target endpoint device.

* * * * *